US009412571B2

(12) United States Patent
Ikegami

(10) Patent No.: US 9,412,571 B2
(45) Date of Patent: Aug. 9, 2016

(54) IMAGING MASS SPECTROMETRIC DATA PROCESSING METHOD AND IMAGING MASS SPECTROMETER

(71) Applicant: SHIMADZU CORPORATION, Kyoto-shi, Kyoto (JP)

(72) Inventor: Masahiro Ikegami, Takaishi (JP)

(73) Assignee: SHIMADZU CORPORATION, Kyoto-shi (JP)

( * ) Notice: Subject to any disclaimer, the term of this patent is extended or adjusted under 35 U.S.C. 154(b) by 0 days.

(21) Appl. No.: 14/785,938

(22) PCT Filed: Apr. 21, 2014

(86) PCT No.: PCT/JP2014/061161

§ 371 (c)(1),
(2) Date: Oct. 21, 2015

(87) PCT Pub. No.: WO2014/175211

PCT Pub. Date: Oct. 30, 2014

(65) Prior Publication Data

US 2016/0071711 A1 Mar. 10, 2016

(30) Foreign Application Priority Data

Apr. 22, 2013 (JP) ................................ 2013-089398

(51) Int. Cl.
*G06F 17/30* (2006.01)
*G06K 9/00* (2006.01)
(Continued)

(52) U.S. Cl.
CPC ......... *H01J 49/0036* (2013.01); *H01J 49/0004* (2013.01); *H01J 49/164* (2013.01); *H01J 49/40* (2013.01)

(58) Field of Classification Search
USPC .......... 250/281, 282, 526; 707/661, 736, 741, 707/E17.002; 382/232, 236, 325; 345/418, 345/599; 702/23.26; 341/899
See application file for complete search history.

(56) References Cited

U.S. PATENT DOCUMENTS 8,498,989 B2 * 7/2013 Ikegami .............. H03M 7/3059 341/87
8,743,138 B2 * 6/2014 Setou ................... G06T 7/0012 345/593

(Continued)

FOREIGN PATENT DOCUMENTS

CN 102683149 A 9/2012
JP 2010-261882 A 11/2010

(Continued)

OTHER PUBLICATIONS

International Written Opinion for PCT/JP2014/061161 dated Jun. 17, 2014 [PCT/ISA/237].

(Continued)

*Primary Examiner* — Bernard Souw
(74) *Attorney, Agent, or Firm* — Sughrue Mion, PLLC

(57) ABSTRACT

Compressed data of mass spectra obtained at respective measurement points and normalization coefficients for XIC normalization or the like are stored in a memory (21). When a normalized imaging graphic at a specific m/z value is to be displayed, a data decompression processor (23) reads the minimally required set of compressed data from the memory (21) and restores the intensity value corresponding to the m/z value at each measurement point. A normalizing calculation processor (29) reads an XIC normalization coefficient corresponding to the m/z value from the memory (21) and corrects the intensity values at each measurement point by multiplying those values by the coefficient. An imaging graphic creation processor (27) assigns a display color to each of the corrected intensity values to create an imaging graphic, and displays the imaging graphic on the screen of a display unit (6). According to this method, even in the case of sequentially displaying imaging graphics while changing the normalization condition, those graphics can be displayed at high speeds if the normalization coefficients are previously calculated and stored.

13 Claims, 9 Drawing Sheets

(51) Int. Cl.
*H01J 49/00* (2006.01)
*H01J 49/40* (2006.01)
*H01J 49/16* (2006.01)

(56) References Cited

U.S. PATENT DOCUMENTS

| | | | | |
|---|---|---|---|---|
| 2004/0102906 | A1 * | 5/2004 | Roder | G06F 19/24 702/22 |
| 2010/0106426 | A1 * | 4/2010 | Hunt | G06K 9/6203 702/19 |
| 2012/0133532 | A1 | 5/2012 | Hunt et al. | |
| 2012/0133671 | A1 * | 5/2012 | Setou | G06T 11/001 345/593 |
| 2012/0209854 | A1 * | 8/2012 | Ikegami | H03M 7/3059 707/741 |
| 2014/0316717 | A1 * | 10/2014 | Ikegami | H01J 49/0004 702/23 |

FOREIGN PATENT DOCUMENTS

| | | | |
|---|---|---|---|
| JP | 2012-38459 | A | 2/2012 |
| JP | 2012-117813 | A | 6/2012 |
| JP | 2012-169979 | A | 9/2012 |

OTHER PUBLICATIONS

Kiyoshi Ogawa, et al., "Research and Development of Mass Microscope", Shimadzu Review, Mar. 31, 2006, pp. 125-135, vol. 62, Nos. 3-4.

Takahiro Harada, et al., "Biological Tissue Analysis Using Mass Microscope", Shimadzu Review, Apr. 24, 2008, pp. 139-145, vol. 64, Nos. 3-4.

Yuki Sugiura, et al., "Visualization of the cell-selective distribution of PUFA-containing phosphatidylcholines in mouse brain by imaging mass spectrometry", Journal of Lipid Research, 2009, pp. 1776-1788, vol. 50.

International Search Report for PCT/JP2014/061161 dated Jun. 17, 2014 [PCT/ISA/210].

* cited by examiner

Fig. 3A
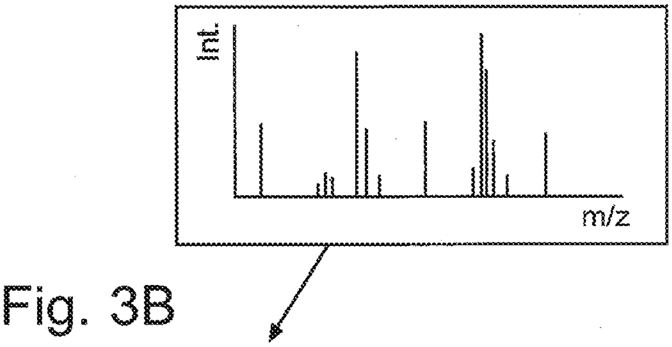
Fig. 3B
ORIGINAL MASS SPECTRUM DATA
Fig. 3C
COMPRESSED DATA
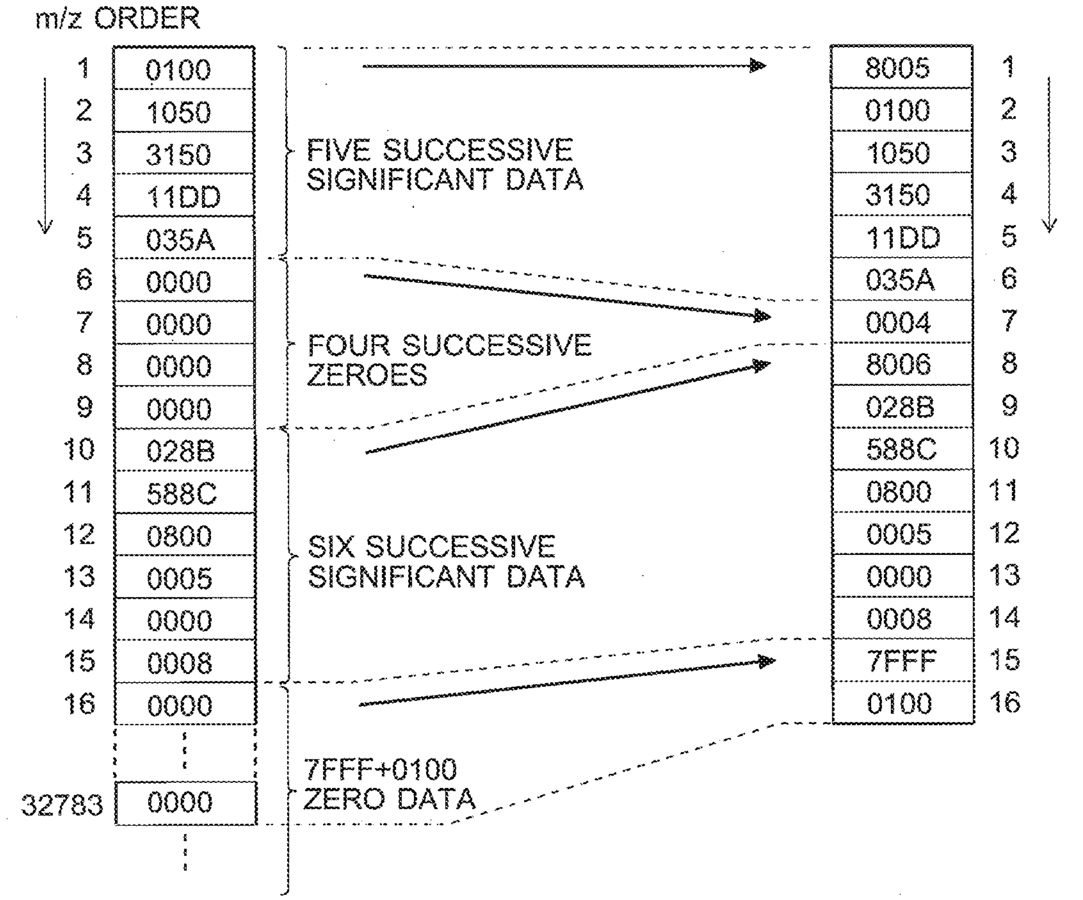

ORIGINAL MASS SPECTRUM DATA
INDEX
COMPRESSED DATA
1 0100
2 1050
3 3150
4 11DD
5 035A
6 0000
7 0000
8 0000
9 0000
10 028B
11 588C
12 0800
13 0005
14 0000
15 0008
16 0000
32783 0000
FIVE SUCCESSIVE DATA
FOUR SUCCESSIVE ZEROES
SIX SUCCESSIVE DATA
7FFF+0100 ZERO DATA
1 1
6 7
10 8
16 15
8005 1
0100 2
1050 3
3150 4
11DD 5
035A 6
0004 7
8006 8
028B 9
588C 10
0800 11
0005 12
0000 13
0008 14
7FFF 15
0100 16

IMAGING MASS SPECTROMETRIC DATA PROCESSING METHOD AND IMAGING MASS SPECTROMETER

CROSS REFERENCE TO RELATED APPLICATIONS

This application is a National Stage of International Application No. PCT/JP2014/061161, filed on Apr. 21, 2014, which claims priority from Japanese Patent Application No. 2013-089398, filed on Apr. 22, 2013, the contents of all of which are incorporated herein by reference in their entirety.

TECHNICAL FIELD

The present invention relates to a data processing method suitable for an imaging mass spectrometer capable of acquiring an imaging graphic showing the signal intensity distribution of an ion having a specific mass-to-charge ratio or ions within a specific range of mass-to-charge ratios on a sample, as well as an imaging mass spectrometer using the same data processing method.

BACKGROUND ART

Mass spectrometric imaging is a technique for investigating the distribution of a substance having a specific mass by performing a mass spectrometry on each of a plurality of measurement points (micro areas) within a two-dimensional area on a sample, such as a piece of biological tissue. This technique is being developed for various applications, such as drug discoveries, biomarker discoveries, and investigation on the causes of various diseases. Mass spectrometers designed for mass spectrometric imaging are generally referred to as "imaging mass spectrometers." This type of device may also be called by different names, such as a "microscopic mass spectrometer" or "mass microscope," since its operation normally includes the steps of performing a microscopic observation of an arbitrary two-dimensional area on a sample, selecting a target region of the analysis based on the observed microscopic image, and performing an imaging mass spectrometry of that region. In the present specification, the term "imaging mass spectrometer" will be used. Non Patent Literatures 1 and 2 disclose the configurations of commonly known imaging mass spectrometers and examples of analyses performed with those devices.

In an imaging mass spectrometer, a set of mass spectrum data over a predetermined mass-to-charge-ratio range is obtained at each of a large number of measurement points within a two-dimensional area on a sample. In order to realize a high level of mass-resolving power, a time-of-flight mass spectrometer (TOFMS) is normally used as the mass analyzer. The amount of mass spectrum data (or time-of-flight spectrum data) per one measurement point is considerably greater than that of the mass spectrum data obtained with other types of mass spectrometers, such as a quadrupole mass spectrometer. Furthermore, to obtain a finer imaging graphic (i.e. a higher level of spatial resolution), the spacing of the measurement points needs to be reduced, which leads to an increase in the number of measurement points on a single sample. Therefore, if the mass spectrometric imaging needs to be performed with a high level of mass-resolving power and a high level of spatial resolution, the total amount of data per one sample will be enormous.

In order to create and display an imaging graphic or perform a statistical analysis by processing data with a commonly used personal computer, it is necessary to load the entire set of data to be processed into the main memory (normally, RAM) of the computer. However, the storage capacity actually available in the main memory of commonly used personal computers is limited, and it is difficult to entirely load the previously mentioned high-precision imaging mass spectrometric data. In such a case, it has been necessary to limit the range of the imaging graphic to be created and displayed in accordance with the limitation on the amount of data that can be loaded into the main memory, or to perform a process using a portion of an external storage device (e.g. hard disk drive) as a virtual main memory while accepting the decrease in the processing rate.

In view of such a problem, a technique in which mass spectrum data obtained with an imaging mass spectrometer are stored in a compressed form is disclosed in Patent Literatures 1-3. By using such a data compression technique, the imaging mass spectrometric data to be processed can be converted into a smaller size of data and loaded into the main memory. Furthermore, according to the technique disclosed in Patent Literature 1, an index showing the correspondence between the position in the array of the original mass spectrum data before compression and the position in the array of the compressed data is created and stored together with or separately from the compressed data. When a set of data (ion-intensity values) corresponding to a given mass-to-charge ratio needs to be retrieved, the compressed data corresponding to the requested data are located with reference to the index information, and the located data are decoded. By this technique, the requested data can be quickly retrieved despite the use of the compressed data.

A MALDI ion source, which is normally used in imaging mass spectrometers, is an ionization technique suitable for biological samples. However, it has the drawback that the ion intensity varies by a considerable amount for each measurement (i.e. for each shot of a laser beam). To compensate for such a drawback, in the process of acquiring a mass spectrum at one measurement point, the measurement is performed a number of times for the same measurement point and the obtained ion-intensity signals are accumulated. However, in some cases, such an accumulation cannot sufficiently cancel the influence of the variation in the ion intensity among the measurement points. Therefore, an imaging graphic which has been simply created from the ion-intensity values obtained at the respective measurement points for a specific mass-to-charge ratio does not always correctly reflect the distribution of the substance concerned. Accordingly, a technique has conventionally been proposed in which the ion-intensity values obtained at each measurement point are not simply used in the process of creating the imaging graphic, but are converted into normalized ion-intensity values according to a predetermined criterion before being used.

For example, Non Patent Literature 1 demonstrates that it is beneficial to perform a TIC or XIC normalization on imaging mass spectrometric data before creating and displaying an imaging graphic or performing a statistical analysis. TIC is the abbreviation which stands for "total ion current," which means the sum of the ion-intensity values obtained within the entire range of mass-to-charge ratios in the mass spectra obtained at each measurement point. By the TIC normalization, the intensity value at each mass-to-charge ratio is normalized so that every measurement point will have the same TIC value. On the other hand, XIC is the abbreviation for the "extract ion current," which means the ion-intensity value at a specified mass-to-charge ratio or the sum of the ion-intensity values within a specified range of mass-to-charge ratios in the mass spectra obtained at each measurement point. By the XIC normalization, the intensity value at each mass-to-charge ratio is normalized so that every measurement point will have the same XIC value, and therefore, it is possible to equalize the peak height at a specific mass-to-charge ratio among the measurement points.

Operators (users) often refer to an average of the mass spectra obtained at all the measurement points or at a group of measurement points within a region of interest specified by the operator, in order to determine the mass-to-charge ratio or mass-to-charge-ratio range for which an imaging graphic needs to be displayed. Such an average mass spectrum can also be beneficially created based on the ion-intensity values obtained through the TIC or XIC normalization.

However, using such normalized ion-intensity values for the creation of an imaging graphic, for the creation of an average spectrum, for a statistical analysis or for other purposes has negative attributes as follows:

For example, in the case of displaying an imaging graphic based on normalized ion-intensity values, the appearance of the imaging graphic considerably changes depending on the normalization condition, such as what type of normalization is performed (e.g. TIC or XIC normalization) and what mass-to-charge ratio (or what range of mass-to-charge ratios) is used as the reference in the case of the XIC normalization. Therefore, the operator needs to specify the normalization condition. In most cases, the actually performed task is such that the imaging graphic and/or average mass spectrum is repeatedly displayed under various normalization conditions and the operator is requested to compare them each time and determine the most appropriate normalization condition. The normalization process requires multiplying the intensity values of the mass spectrum at each measurement point by a normalization coefficient which changes with the normalization condition. Therefore, every time the normalization condition is changed, it is necessary to perform related processes, such as calculating the normalization coefficient and performing the normalization of the imaging mass spectrometric data using the new coefficient, whereby a considerable amount of time is required for the data processing. Furthermore, storing the entire set of mass spectrum data normalized under various normalization conditions is impractical since the data size will be considerably large even if the aforementioned data compression technique for the storage of mass spectrum data obtained at each measurement point is applied.

A statistical analysis for comparing imaging mass spectrometric data of a plurality of samples is performed as follows: The mass-to-charge ratio (or mass-to-charge-ratio range) of a representative peak is selected from the average mass spectrum or a maximum intensity mass spectrum which is created by extracting the maximum intensity value at each mass-to-charge ratio over the entire group of measurement points. The ion-intensity value at the selected mass-to-charge ratio in the mass spectrum at each measurement point is determined A peak matrix which shows a set of mass-to-charge-ratio values and ion-intensity values is created, and various statistical analyses are performed on this peak matrix. To correctly perform a statistical analysis, the statistical analysis may be repeated while changing the mass-to-charge-ratio value in the peak matrix. However, this significantly lowers the working efficiency, since the calculation of the peak matrix takes a considerable amount of time. The process will be even more complex and time-consuming if it includes a statistical analysis based on imaging mass spectrometric data normalized under various conditions.

Furthermore, in general, the software for creating and displaying an imaging graphic for a specific mass-to-charge ratio or an average spectrum over a specific region of interest based on imaging mass spectrometric data, and the software for performing statistical analyses have been provided as independent programs due to the limitation on the capacity of the main memory available on a computer. Therefore, for example, in order to visually check a detailed imaging graphic for a mass-to-charge ratio which has been determined to be useful by a statistical analysis, the operator needs to perform the extremely cumbersome task of interchanging a data file between the separate software programs as well as starting and ending each of those programs.

CITATION LIST

Patent Literature

Patent Literature 1: JP 2012-169979 A

Patent Literature 2: JP 2012-038459 A

Patent Literature 3: US 2012/0133532 A

Non Patent Literature

Non Patent Literature 1: Ogawa et al., "Kenbi shitsuryou Bunseki Souchi No Kaihatsu" ("Research and Development of Mass Microscope"),*Shimadzu Review*, Vol. 62, Nos.3-4, issued on Mar. 31, 2006, pp. 125-135

Non-Patent Literature 2: Harada et al., "Kenbi shitsuryou Bunseki Souchi Ni Yoru Seitai Soshiki Bunseki," ("Biological Tissue Analysis Using Mass Microscope"), Shimadzu Review, Vol. 64, Nos. 3-4, issued on Apr. 24, 2008, pp. 139-145

Non Patent Literature 3: Y. Sugiura et al., "Visualization of the cell-selective distribution of PUFA-containing phosphatidylcholines in mouse brain by imaging mass spectrometry", *Journal of Lipid Research*, Vol. 50, 2009, pp. 1776-1788

SUMMARY OF INVENTION

Technical Problem

The present invention has been developed in view of the previously described problems. Its primary objective is to provide an imaging mass spectrometric data processing method and imaging mass spectrometer capable of performing high-speed processing by efficiently using the main memory installed in the computer, in the process of creating and displaying an imaging graphic or mass spectrum which has been normalized, based on data obtained with an imaging mass spectrometer, in order to reduce the influence of the variation in the ion-intensity value among measurement points or for other purposes.

The second objective of the present invention is to provide an imaging mass spectrometric data processing method and imaging mass spectrometer capable of performing high-speed processing by efficiently using the main memory installed in the computer, in the process of performing a statistical analysis based on data obtained with an imaging mass spectrometer.

Solution to Problem

The first aspect of the present invention developed for solving the previously described problem is an imaging mass spectrometric data processing method for processing imaging mass spectrometric data collected by performing a mass spectrometry on each of a plurality of measurement points on a sample, the imaging mass spectrometric data including a plurality of sets of mass spectrum data, where each set is composed of a one-dimensional array of ion-intensity values, related to spatial position information of the measurement point, and the method including:

a) a compression step, in which a compression process is performed on the imaging mass spectrometric data of each measurement point according to a predetermined algorithm, and the obtained compressed data are stored in a first storage area of a storage unit;

b) a normalization coefficient preparation step, in which a normalization coefficient for normalizing the intensity values in the imaging mass spectrometric data of each measurement point according to a predetermined criterion is calculated for each measurement point, and the calculated result is stored in a second storage area of the storage unit;

c) a normalized spectrum creation step, in which at least one of an accumulated mass spectrum, an average mass spectrum or a maximum intensity mass spectrum composed of maximum intensity values extracted at each mass-to-charge ratio, of normalized mass spectra obtained at a plurality of designated or specific measurement points, is calculated as a normalized mass spectrum, using the compressed data of the intensity values corresponding to each measurement point stored in the first storage area of the storage unit, the normalization coefficient of each measurement point stored in the second storage area of the storage unit, and the spatial position information of the measurement points; and d) a normalized graphic creation step, in which an imaging graphic showing a two-dimensional distribution of the normalized intensity values for a designated or specific mass-to-charge ratio or mass-to-charge-ratio range is created, using the compressed data of the intensity values corresponding to each measurement point stored in the first storage area of the storage unit, the normalization coefficient of each measurement point stored in the second storage area of the storage unit, and the spatial position information of the measurement points.

In the imaging mass spectrometric data processing method according to the first aspect of the present invention, when imaging mass spectrometric data collected with an imaging mass spectrometer are given as the target of the analysis, the compression step is initially executed, in which a compression process is performed on the one-dimensional array of the mass spectrum data obtained at each measurement point and the compressed data are stored in a storage unit, such as the main memory of a computer. The "one-dimensional array of the mass spectrum data" is typically a data row in which the intensity values related to the respective mass-to-charge ratios are arrayed in order of the mass-to-charge ratio. It also includes, for example, a data row in which the intensity values related to the respective times of flight obtained with a time-of-flight mass spectrometer are arrayed in order of the time of flight. For the lossless compression, any encoding method may be used; for example, the run-length encoding, entropy encoding, or a combination of these encoding methods can be used.

In the normalization coefficient preparation step, a coefficient for normalizing the intensity values in the mass spectra data obtained at each measurement point according to a predetermined criterion is calculated for each small measurement area, and the result is stored in the second storage area of the storage unit. For this normalization, at least the aforementioned techniques, i.e. the TIC or XIC normalization, can be used. Preferably, when the mass-to-charge ratio or mass-to-charge-ratio range for the XIC normalization is specified, the normalization coefficient preparation step should always be performed to calculate the normalization coefficient for that mass-to-charge ratio or mass-to-charge-ratio range and store it in the second storage area of the storage unit.

For example, when the creation of an average mass spectrum over a specific region of interest is commanded by the operator, the normalized spectrum creation step is performed as follows: The compressed data corresponding to the measurement points within the region of interest are read from the first storage area of the storage unit. The read data are decompressed and a mass spectrum is calculated for each measurement point. Meanwhile, the TIC normalization coefficient, or the XIC normalization coefficient corresponding to the specified mass-to-charge ratio is read from the second storage area of the storage unit. Each intensity value in the mass spectra obtained in the previously described manner is multiplied by the read coefficient. Based on the thereby normalized mass spectra, a normalized average mass spectrum is calculated. In the case where the creation of average mass spectra with different normalization conditions (e.g. with different XIC normalization coefficients) has been commanded, the normalization coefficient corresponding to each normalization condition is read from the second storage area of the storage unit. Using each normalization coefficient, the normalization of the corresponding mass spectra is similarly performed and the average mass spectrum is calculated.

On the other hand, for example, when the creation of an imaging graphic for a specific mass-to-charge ratio or mass-to-charge-ratio range is commanded by the operator, the normalized graphic creation step is performed as follows: The minimally required compressed data corresponding to the specified mass-to-charge ratio or the like are read from the first storage area of the storage unit. The read data are decompressed and an imaging graphic is created for each mass-to-charge ratio or the like. Meanwhile, the TIC normalization coefficient, or the XIC normalization coefficient corresponding to the specified mass-to-charge ratio or the like is read from the second storage area of the storage unit. The intensity value at each measurement point in the imaging graphic obtained in the previously described manner is multiplied by the read coefficient to calculate the normalized imaging graphic. In the case where the creation of imaging graphics with different normalization conditions (e.g. with different XIC normalization coefficients) has been commanded, the normalization coefficient corresponding to each normalization condition is read from the second storage area of the storage unit. Using each normalization coefficient, the normalization of the intensity values in the corresponding imaging graphic is similarly performed to create a normalized imaging graphic.

Thus, according to the first aspect of the present invention, the compressed data of the imaging mass spectrometric data are held in the storage unit (such as the main memory of a computer) without change, and the normalization coefficients for normalization are held in a separate area of the storage unit. When a normalized mass spectrum or imaging graphic is to be created, the intensity values obtained by decompressing the compressed data are multiplied by a normalization coefficient, and the result is presented. As a result, a mass spectrum or imaging graphic identical to those obtained by normalizing the original imaging mass spectrometric data is obtained.

Preferably, the imaging mass spectrometric data processing method according to the first aspect of the present invention should further include a mass-to-charge ratio specification step, in which the normalized mass spectrum created in the normalized spectrum creation step is displayed on a screen of a display unit, and a mass-to-charge ratio or mass-to-charge-ratio range of the imaging graphic to be created in the normalized graphic creation step is set in response to a specification of the mass-to-charge ratio or mass-to-charge-ratio range by an operator based on the displayed information.

By this data processing method, the operator can visually check the normalized mass spectrum, recognize a mass-to-charge ratio or mass-to-charge-ratio range suitable for grasping the two-dimensional distribution of a target substance, and display an imaging graphic corresponding to that ratio or range.

The imaging mass spectrometric data processing method according to the first aspect of the present invention may further include:

a spectrum creation step, in which at least one of an accumulated mass spectrum, an average mass spectrum or a maximum intensity mass spectrum of nonnormalized mass spectra obtained at a plurality of designated or specific small measurement areas is calculated, using the compressed data of the intensity values corresponding to each measurement point stored in the first storage area of the storage unit and the spatial position information of the measurement points; and a graphic creation step, in which an imaging graphic showing a two-dimensional distribution of nonnormalized intensity values for a designated or specific mass-to-charge ratio or mass-to-charge-ratio range is created, using the compressed data of the intensity values corresponding to each measurement point stored in the first storage area of the storage unit and the spatial position information of the measurement points.

The spectrum creation step may be implemented as a portion of the process of the normalized spectrum creation step, and the graphic creation step may be implemented as a portion of the normalized graphic creation step. That is to say, in the process of creating the normalized mass spectrum or normalized imaging graphic, a mass spectrum or imaging graphic based on the intensity values before being multiplied by the normalization coefficient may also be created. Alternatively, all of the normalization coefficients may be set to 1 in the normalizing process. By this method, not only the normalized mass spectrum or normalized imaging graphic, but also a nonnormalized average mass spectrum or imaging graphic can be additionally created and displayed, so that a wider variety of information will be available for the operator.

Preferably, the imaging mass spectrometric data processing method according to the first aspect of the present invention may further include:

a peak matrix creation step, in which a peak detection is performed on either the normalized mass spectrum created in the normalized spectrum creation step or nonnormalized mass spectrum to create a list of mass-to-charge-ratio values of peaks, the intensity values corresponding to the mass-to-charge ratios in the list are determined from the mass spectrum data of each measurement point, and a peak matrix holding those intensity values arranged according to the mass-to-charge-ratio values is created;

a peak matrix normalization step, in which the intensity values in the peak matrix created in the peak matrix creation step are normalized by the normalization coefficient prepared in the normalization coefficient preparation means; and a statistical analysis step, in which a statistical analysis is performed on the peak matrix normalized in the peak matrix normalization step or on the peak matrix created in the peak matrix creation step.

In this case, it is also possible to further provide a display step, in which the imaging graphic created in the normalized graphic creation step, the normalized mass spectrum created in the normalized spectrum creation step, and a statistical analysis result obtained in the statistical analysis step are simultaneously displayed on a screen of a display unit.

Alternatively, it is possible to additionally provide a display step, in which all or at least some of the following kinds of information are simultaneously displayed on a screen of a display unit: one normalized imaging graphic or a plurality of normalized imaging graphics with different normalization conditions created in the normalized graphic creation step, or an imaging graphic created in the graphic creation step; one normalized mass spectrum or a plurality of normalized mass spectra with different normalization conditions created in the normalized spectrum creation step, or a mass spectrum created in the spectrum creation step; and the statistical analysis result obtained in the statistical analysis step in which a statistical analysis is performed on one normalized peak matrix or a plurality of normalized peak matrices with different normalization conditions normalized in the peak matrix normalization step, or on the peak matrix created in the peak matrix creation step.

By this method, it is not only possible to merely display the normalized average mass spectrum or imaging graphic, but also to perform a statistical analysis under any normalization condition using the compressed data and the normalization coefficients stored in the main memory, and allow the result to be visually checked together with the average mass spectrum or imaging graphic. It is also possible to simultaneously display both normalized and nonnormalized results of the average mass spectrum, imaging graphic or statistical analysis result, respectively, or to simultaneously display a plurality of results obtained by performing the normalization under different normalization conditions.

As previously noted, in general, the software for creating and displaying an imaging graphic or the like, and the software for performing a statistical analysis have been separated from each other due to the limitation on the main memory or other factors. The previously described data processing method allows for easy integration of those software programs since the data stored in the main memory can be almost commonly used in both the process for creating and displaying an imaging graphic or the like, and the process for statistical analysis. This also allows for a linkage between the process for creating and displaying an imaging graphic or the like and the process for statistical analysis, and eliminates the necessity of manually starting and ending each of the separate software programs. Therefore, the working efficiency will be improved.

The previously described data processing technique in which the process for creating and displaying an imaging graphic, average mass spectrum or other information is linked with the process for statistical analysis by commonly using the compressed data of the imaging mass spectrometric data can also be applied in the case where the normalization of the intensity values is not performed. Thus, the imaging mass spectrometric data processing method according to the second aspect of the present invention developed for solving the previously described problem is an imaging mass spectrometric data processing method for processing imaging mass spectrometric data collected by performing a mass spectrometry on each of a plurality of measurement points on a sample, the imaging mass spectrometric data including a plurality of sets of mass spectrum data, where each set is composed of a one-dimensional array of ion-intensity values, related to spatial position information of the measurement point, and the method including:

a) a compression step, in which a lossless compression process is performed on the imaging mass spectrometric data of each measurement point according to a predetermined algorithm, and the obtained compressed data are stored in a first storage area of a storage unit;

b) a graphic creation step, in which an imaging graphic showing a two-dimensional distribution of nonnormalized intensity values for a designated or specific mass-to-charge ratio or mass-to-charge-ratio range is created, using the compressed data of the intensity values corresponding to each measurement point stored in the first storage area of the storage unit and the spatial position information of the measurement points;

c) a spectrum creation step, in which at least one of an accumulated mass spectrum, an average mass spectrum or a maximum intensity mass spectrum of nonnormalized mass spectra obtained at a plurality of designated or specific small measurement areas is calculated, using the compressed data of the intensity values corresponding to each measurement point stored in the first storage area of the storage unit and the spatial position information of the measurement points;

d) a peak matrix creation step, in which a peak detection is performed on the mass spectrum created in the spectrum creation step to create a list of mass-to-charge-ratio values of peaks, the intensity values corresponding to the mass-to-charge ratios in the list are determined from the mass spectrum data of each measurement point, and a peak matrix holding those intensity values arranged according to the mass-to-charge-ratio values is created; and e) a statistical analysis step, in which a statistical analysis is performed on the peak matrix created in the peak matrix creation step.

The imaging mass spectrometric data processing method according to the second aspect allows for easy integration of the software programs since the data stored in the main memory can be almost commonly used in both the process for creating and displaying an imaging graphic or the like, and the process for statistical analysis. This also allows for a linkage between the process for creating and displaying an imaging graphic or the like and the process for statistical analysis, and eliminates the necessity of manually starting and ending each of the separate software programs. Therefore, the working efficiency will be improved.

In the imaging mass spectrometric data processing methods according to the first and second aspects of the present invention, the compressed data can be decompressed without using external information. However, depending on the data compression method, the extraction of the intensity values corresponding to a specific mass-to-charge ratio may require a considerable amount of time. Therefore, in addition to the compressed data, index information for relating the compressed data to the position information of the intensity values in the array of the original data may preferably be stored in a third area of the storage unit so that the index information can be referenced to retrieve the intensity values corresponding to a specific mass-to-charge ratio.

By this method, the decompression process for extracting the intensity values corresponding to an arbitrary mass-to-charge ratio from the compressed data can be performed at high speeds, so that the process for displaying the imaging graphic or average mass spectrum using the compressed data, the process for statistical analysis, or other processes can be performed at high speeds.

An imaging mass spectrometer according to the present invention developed for solving the previously described problem includes: an imaging mass spectrometer unit for collecting mass spectrum data by performing a mass spectrometry on each of a plurality of measurement points on a sample; and a data processing unit for carrying out the imaging mass spectrometric data processing method according to the present invention.

The configuration of the imaging mass spectrometer unit, or more specifically, the types of ion source, mass analyzer and other components are not limited to any specific types. Typically, the ion source is a MALDI ion source, and the mass analyzer is a time-of-flight mass spectrometer. The imaging mass spectrometer unit may also have an ion-dissociating section for dissociating ions into product ions one time or in stages by collision induced dissociation or a similar process, and perform a mass spectrometry on those product ions.

Advantageous Effects of the Invention

With the imaging mass spectrometric data processing method and the imaging mass spectrometer according to the present invention, when imaging graphics and/or average mass spectra which have undergone various normalizations under different conditions are to be created and displayed, it is unnecessary to prepare a plurality of data files which respectively hold imaging mass spectrometric data obtained through those different kinds of normalizations, and to load those data files into the main memory and process them every time a display command or the like is given. In particular, the original imaging mass spectrometric data (in the compressed form) are statically held in the main memory, and the normalization coefficients to be used for normalizing the intensity values under various conditions are also held in the main memory. Therefore, it is possible to quickly display the imaging graphic, average mass spectrum and/or other information obtained by the normalizing process using those normalization coefficients. It is also possible to temporarily hold, in the main memory, a plurality of average spectra, imaging graphics or the like obtained from the same set of imaging mass spectrometric data under different normalization conditions, in which case a plurality of average spectra, imaging graphics or the like obtained under different normalization conditions can be simultaneously displayed so that the operator can easily compare those pieces of information. Even in the case of displaying such information, the amount of data to be held in the main memory is not significantly larger than the total of the compressed data of the imaging mass spectrometric data and the data of the normalization coefficients used under various conditions, since the amount of data of the average spectra, imaging graphics or the like is not significantly large. Accordingly, it is possible to create a less expensive system by using a main memory with a comparatively low capacity.

Furthermore, the imaging mass spectrometric data processing method and the imaging mass spectrometer according to the present invention allow for a linkage between the creation and display of an imaging graphic and the statistical analysis. For example, it is possible to quickly and smoothly display an imaging graphic for a mass-to-charge ratio which has been determined to be significant as a result of a statistical analysis. For the display of such an imaging graphic, it is possible to create an imaging graphic using the original imaging mass spectrometric data instead of creating an imaging graphic from the intensity values held as the peak matrix. Therefore, a fine and detailed imaging graphic can be displayed. Furthermore, the integration of the software for creating and displaying an imaging graphic or mass spectrum and the software for the statistical analysis eliminates the necessity of manually starting and ending each of the separate software programs, which improves the working efficiency.

BRIEF DESCRIPTION OF DRAWINGS

FIGS. 3A-3C are conceptual diagrams showing one example of the data compression in the imaging mass spectrometric system of the present embodiment.

DESCRIPTION OF EMBODIMENTS

One embodiment of the imaging mass spectrometric data processing method according to the present invention and the imaging mass spectrometer using the same method is hereinafter described with reference to the attached drawings.

Figure 1:
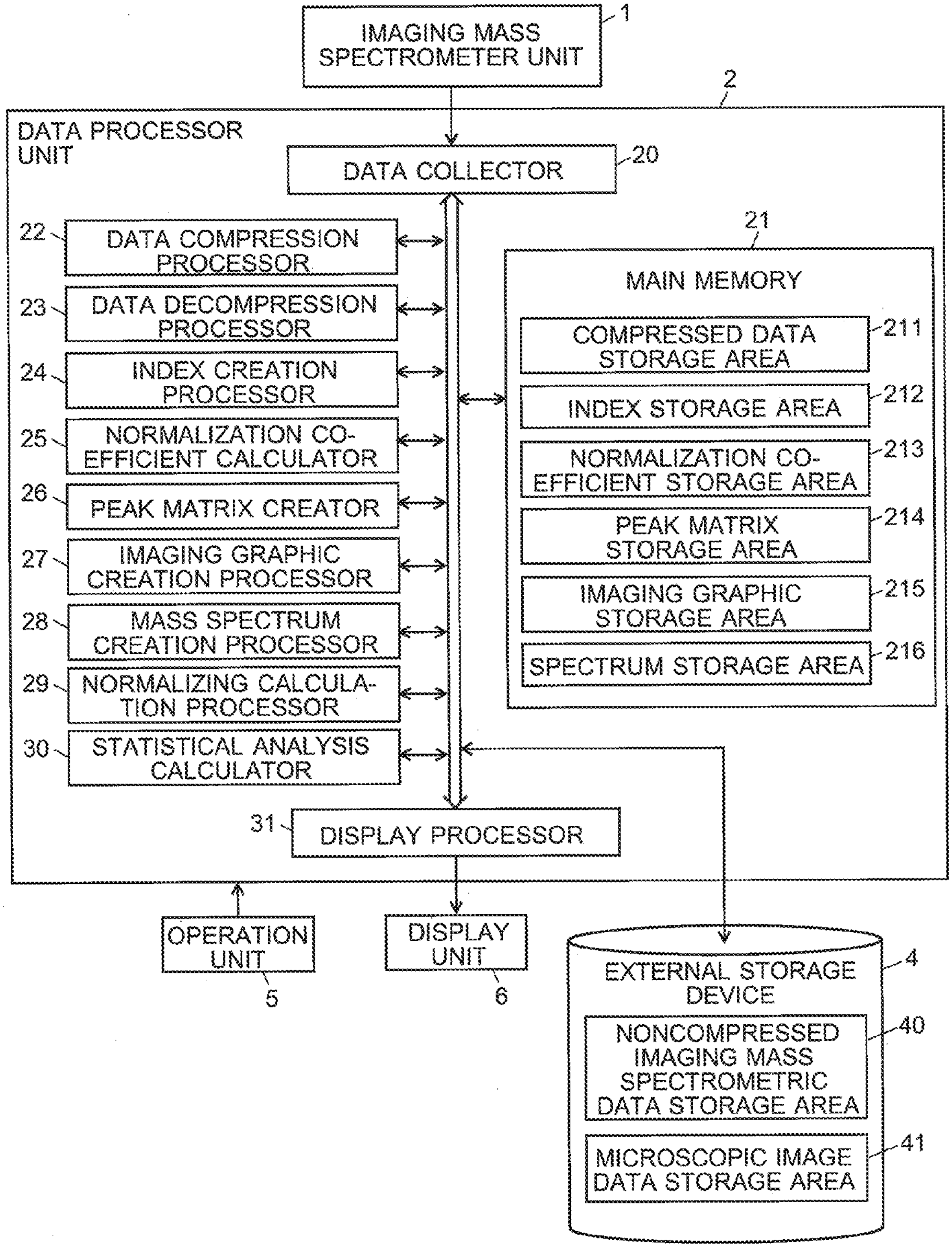
FIG. 1 is a schematic configuration diagram of one embodiment of an imaging mass spectrometric system for carrying out an imaging mass spectrometric data processing method according to the present invention.

FIG. 1 is a configuration diagram showing the main components of an imaging mass spectrometric system capable of performing an imaging mass spectrometric data processing method which is one embodiment of the present invention.

This imaging mass spectrometric system includes: an imaging mass spectrometer unit 1 for performing a mass spectrometry for each of a large number of two-dimensionally arranged measurement points on a sample to obtain mass spectrum data within a predetermined mass-to-charge-ratio range for each measurement point; a data processing unit 2 for performing various kinds of data processing (which will be described later) on the obtained data; a high-capacity external storage device 4, such as a hard disk drive (HDD) or solid-state drive (SSD), for storing raw mass spectrum data obtained with the imaging mass spectrometer unit 1; an operation unit 5 to be operated by an operator; and a display unit 6 for showing the results of an analysis and other information. The data processing unit 2 is actually a personal computer or higher-performance workstation including a CPU, RAM, ROM and other components. The data processing unit 2 includes, as its functional blocks, a data collector 20, main memory 21, data compression processor 22, data decompression processor 23, index creation processor 24, normalization coefficient calculator 25, peak matrix creator 26, imaging graphic creation processor 27, mass spectrum creation processor 28, normalizing calculation processor 29, statistical analysis calculator 30, and display processor 31.

Figure 10:
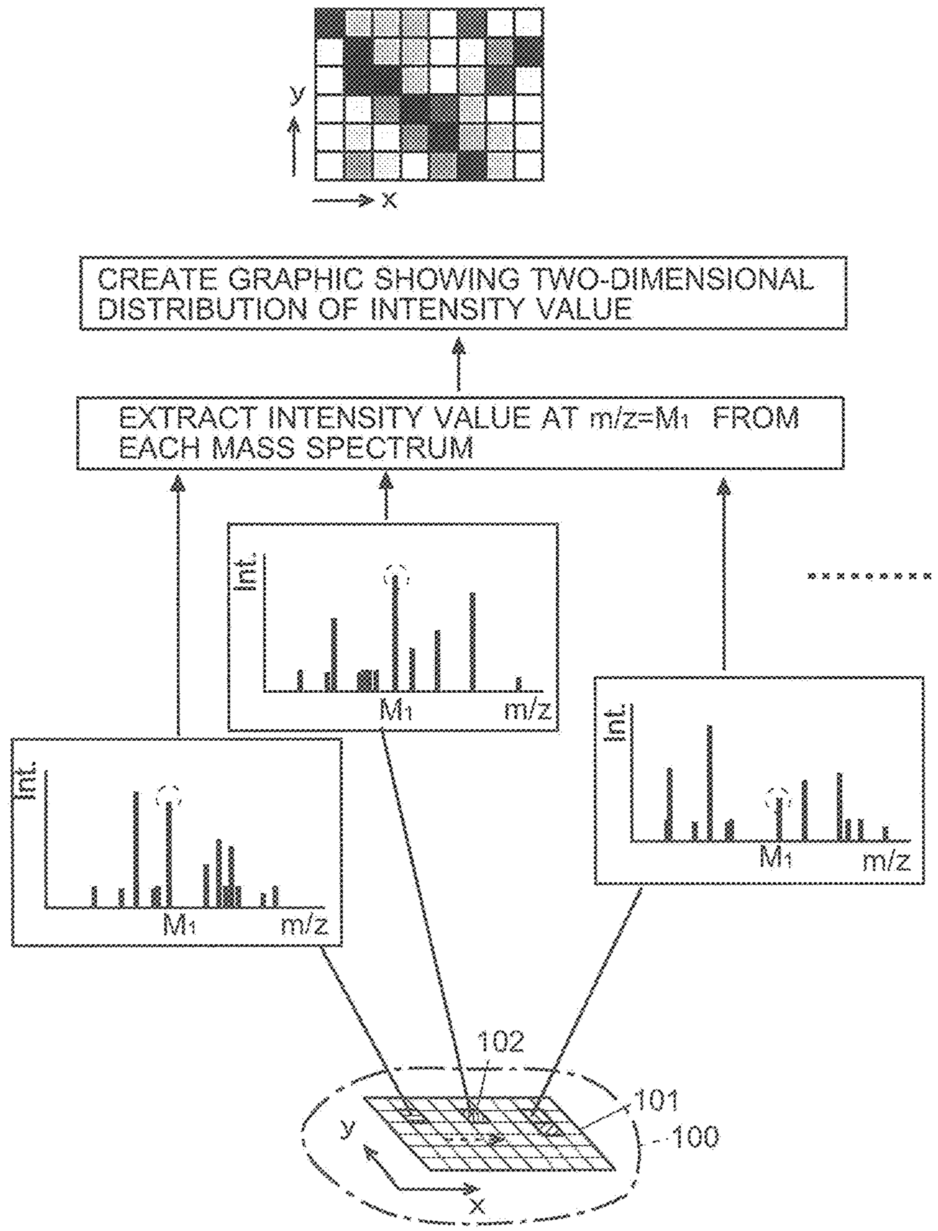
FIG. 10 is an outline illustration showing data obtained by an imaging mass spectrometry and a two-dimensional imaging graphic display based on those data.

As shown in FIG. 10, the imaging mass spectrometer unit 1 performs a mass spectrometry on each of a large number of measurement points (micro areas) 102 within a measurement region 101 specified by an operator on a sample 100. In the present embodiment, the imaging mass spectrometer unit 11 may have any configuration. Typically, it includes a mass spectrometer section having a MALDI ion source combined with a TOFMS, with the sample 100 placed on a sample stage (not shown), which can be precisely moved in the two axial directions of the x and y axes so that the mass spectrometry can be performed at any point on the sample 100.

Preferably, the imaging mass spectrometer unit 1 is provided with an optical microscope and an imaging system using a CCD or CMOS imaging device, so as to take an image of the sample 100 with a sufficiently higher degree of resolution than the spacing of the measurement points and present the image to the operator through the data collector 20, display processor 31 and display unit 6. The operator refers to this image and specifies, through the operation unit 5, the region corresponding to the measurement area 101. Upon this operation, the data processor unit 2 calculates the coordinate information of the specified region. The imaging mass spectrometer unit 1 moves the sample stage to the positional coordinates corresponding to the specified region and performs a mass spectrometry at each measurement point to obtain mass spectrum data.

The data collector 20 reads the mass spectrum data obtained with the imaging mass spectrometer unit 1 and the data of the microscopic image taken with the imaging system of the imaging mass spectrometer unit 1, and stores the two kinds of data in the noncompressed imaging mass spectrometric data storage area 40 and the microscopic image data storage area 41 of the external storage device 4, respectively. The entire set of data collected for one sample may preferably be stored, for example, in the form of a single data file.

Using the imaging mass spectrometric data stored in the external storage device 4 in this manner, the data processing unit 2 performs the analytical processing operation, the process steps of which will be hereinafter described.

[Initial Operation of Analytical Processing]

Figure 2:
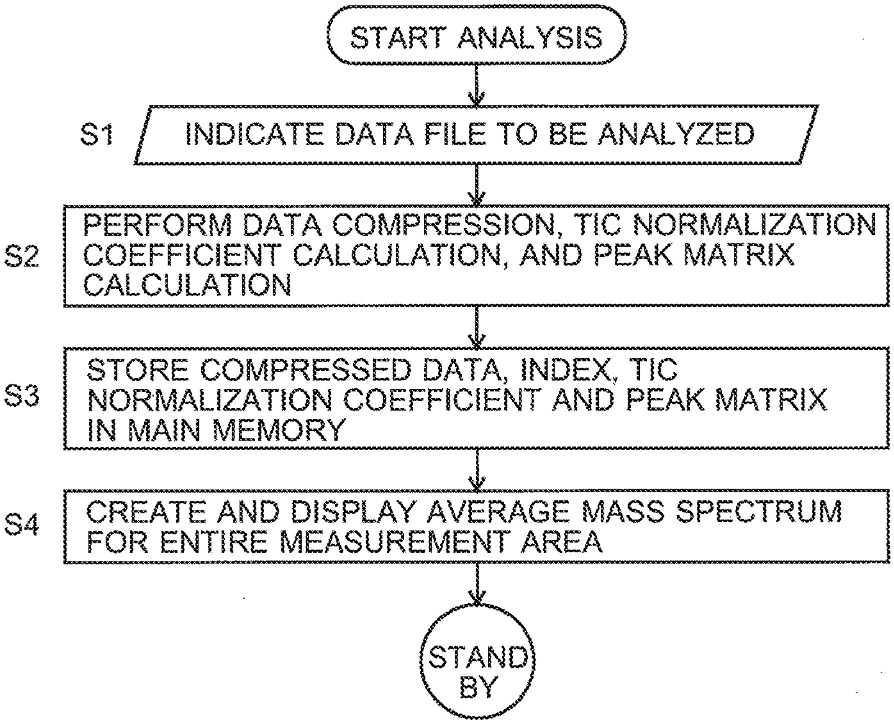
FIG. 2 is a flowchart of the process which is performed when a data file to be analyzed is indicated by an operator in the imaging mass spectrometric system of the present embodiment.

FIG. 2 is a flowchart of the processing initially performed in the data processing unit 2 when a data file to be analyzed is indicated by an operator.

For example, when the dedicated data-processing software program is executed on the computer and a data file to be processed is indicated by the operator through the operation unit 5 (Step S1), the data compression processor 22 sequentially reads mass spectrum data corresponding to each measurement point from the external storage device 4 and compresses those data for each measurement point according to a data compression algorithm (which will be described later). The index creation processor 24 creates an index (which will be described later) for each measurement point, using the mass spectrum data (original mass spectrum data) and the compressed data. The normalization coefficient calculator 25 calculates the TIC normalization coefficient for each measurement in a manner to be described later. The peak matrix creator 26 calculates a peak matrix for a statistical analysis in a manner to be described later (Step S2). The compressed data, index, TIC normalization coefficients and peak matrix calculated in this manner for the mass spectrum data are respectively stored in the compression data storage area 211, index storage area 212, normalization coefficient storage area 213, and peak matrix storage area 214 of the main memory 21 (Step S3).

Additionally, the mass spectrum creation processor 28 calculates an average mass spectrum by accumulating, for each mass-to-charge ratio, the mass spectrum data obtained at all measurement points and dividing each accumulated value by the total number of measurement points. The average mass spectrum is stored in the spectrum storage area 216 of the main memory 21, and is also displayed on the screen of the display unit 6 through the display processor 31 (Step S4). The displayed average mass spectrum allows the operator to generally view the result and roughly locate the mass-to-charge ratios at which the ion intensity is high (or the masses of the substance which are abundant).

[Details of Mass Spectrum Data Compression Process]

The process of compressing mass spectrum data used in the present invention will be described using FIGS. 3A-4C. This data compression method is the one disclosed in Patent Literature 1.

A set of imaging mass spectrometric data obtained for one sample includes a one-dimensional data array of mass-to-charge-ratio values common to all measurement points and a one-dimensional data array of the ion-intensity values of the mass spectrum obtained for each measurement point. If the imaging mass spectrometer unit 1 is configured as a system employing a TOFMS, a one-dimensional data array of time-of-flight values may be used instead of the one-dimensional data array of the mass-to-charge-ratio values. The present description deals with the case of compressing a one-dimensional data array of the ion-intensity values extracted from a mass spectrum as shown in FIG. 3A.

It is hereinafter assumed that one ion-intensity value at a certain mass-to-charge ratio has a data size of two bytes, or 16 bits (in the present description, data values are expressed in HEX notation enclosed by the brace brackets). Before the data compression, each intensity value is examined as to whether or not it is less than a predetermined noise level, and any intensity value below the noise level is replaced by zero. After such a preprocessing, the array is most likely to have the intensity value of zero successively occurring within sections other than the significant peaks.

For a one-dimensional array of the ion-intensity values as shown in FIG. 3B, the intensity values are sequentially examined in ascending order of mass-to-charge ratio (in the order indicated by the downward arrow in FIG. 3B). If the intensity value of zero ({0000} in FIGS. 3A-4C) has been found to sequentially occur two or more times, the sequence of zeroes is replaced by a single value showing the number of zeroes. The upper limit for the number of zeroes to be sequentially counted is 32,767. When the sequence of zero-intensity data has been found to exceed this limit, the already counted zero data are replaced by {7FFF}, and the number of remaining zero-intensity data in the sequence is stored as the next element in the array of the compressed data.

On the other hand, if a sequence of one or more non-zero intensity values has been found, the number of those values is stored at the beginning of that sequence in the array of the compressed data, after which those intensity values are sequentially stored without change. Once again, the upper limit for the number of values to be sequentially counted is 32,767. When this limit is reached, the counting and storing of the intensity values according to the same algorithm is restarted from that point. For a sequence of non-zero intensity values, the two-byte data to be stored at the beginning of the sequence in the array of the compressed data to indicate the number of successive data values is given the most significant bit (MSB) of "1." That is to say, the number of successive data values is indicated by the 15 bits exclusive of the MSB in the two-byte (16-bit) data value. Accordingly, if a data value indicative of the number of successive data values has a value equal to or greater than 32768 ($=2^{15}$), it is possible to immediately deduce that the following section is a sequence of non-zero data values since the thereby indicated number is greater than {7FFF}. The actual number of successive data values can be obtained by removing the MSB from the binary value or subtracting {8000} from the HEX value.

In the example of FIG. 3B, the one-dimensional array of the ion-intensity values begins with five successive significant data values of non-zero intensities. Accordingly, in the array of the compressed data shown in FIG. 3C, the data value {8005}, with the MSB set to "1" and the other bits representing "5", is stored at the beginning of the sequence, after which the five data values in the array of the original mass spectrum data are sequentially stored in the array of the compressed data without change. Therefore, the five successive data in the array of the original mass spectrum data correspond to six successive data in the array of the compressed data. The next section in the array of the original mass spectrum data consists of four successive zero-intensity data. Therefore, in the array of the compressed data, this section is replaced by a single data value of {0004}. According to such rules, the one-dimensional array of the ion-intensity values is converted into the array of the compressed data.

Figures 4A, 4B, 4C:
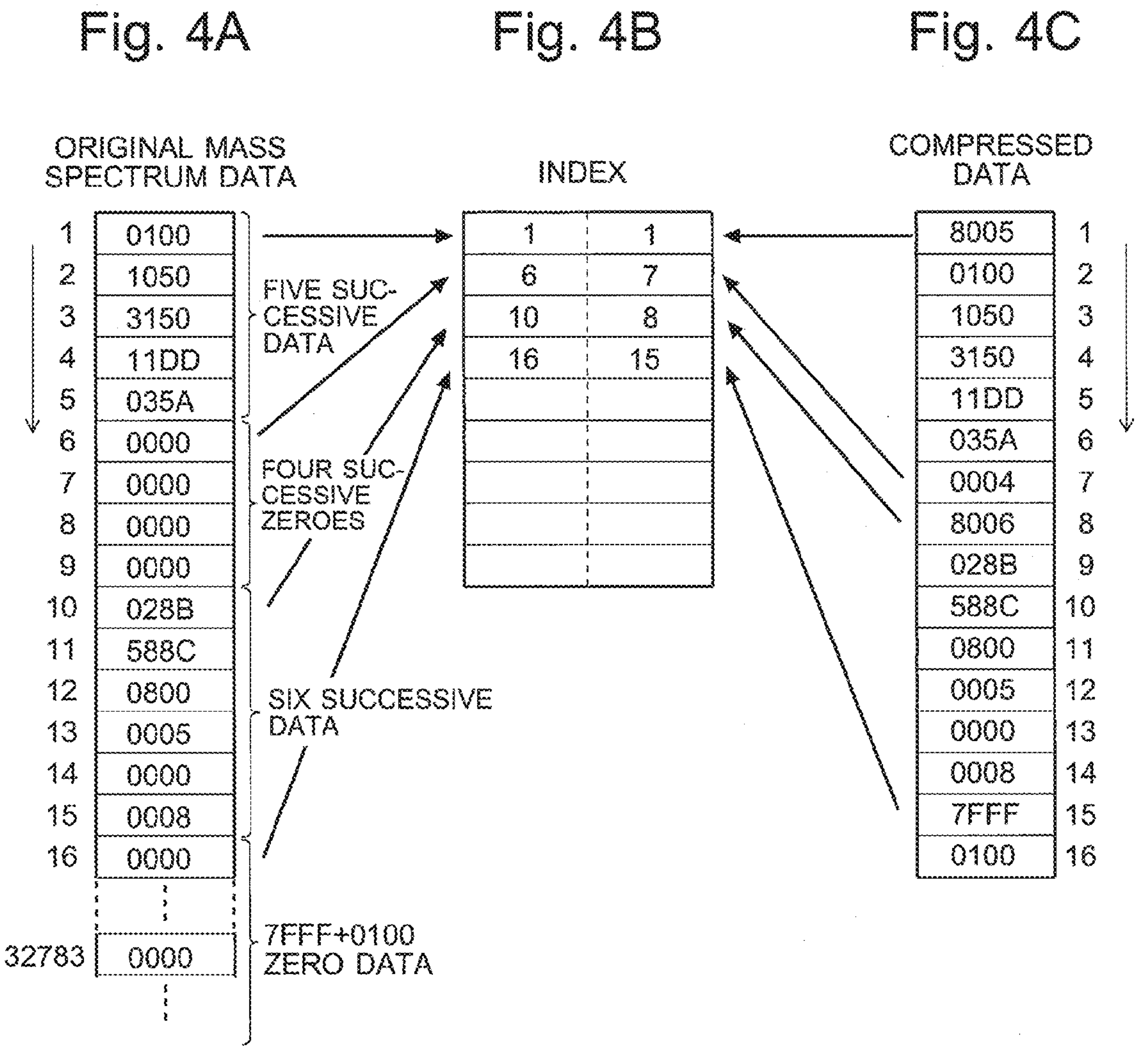
FIGS. 4A-4C are conceptual diagrams showing one example of the creation of the index information in the imaging mass spectrometric system of the present embodiment.

The index in FIG. 4B shows the correspondence relationship between the position in the array of the original mass spectrum data and the position in the array of the compressed data. Specifically, this index is a list having a plurality of rows each of which holds one of the following two kinds of positional relation information: the combination of the starting position of a section consisting of two or more successive zero-intensity data in the array of the original mass spectrum data (e.g. the sixth place in the array of the original mass spectrum data in FIG. 4A) and the position corresponding to that section in the array of the compressed data (e.g. the seventh place in the array of the compressed data in FIG. 4C), and the combination of the starting position of a sequence of data with significant intensity values in the array of the original mass spectrum data (e.g. the tenth place in the array of the original mass spectrum data in FIG. 4A) and the position corresponding to that sequence in the array of the compressed data (e.g. the eighth place in the array of the compressed data in FIG. 4C). The procedure for creating such an index is not essential to the present invention, and therefore, will not be described. It can be easily created by the technique described in Patent Literature 1. This index is not indispensable for restoring the original spectrum data from the compressed data. However, the use of this index enables high-speed calculation of the intensity values for any mass-to-charge ratio.

The technique for the data compression coding is not limited to the previously described method disclosed in Patent Literature 1. It is also possible to use the method disclosed in Patent Literature 2, 3 or other documents, as well as various other methods.

Actually, the amount of time required for compressing one set of mass spectrum data is sufficiently shorter than that required for moving the sample stage to each measurement point and performing a mass spectrometry on that measurement point in the imaging mass spectrometer unit 1. The CPU load due to the processing performed by the data collector 20 during the measurement is not heavy. Therefore, during the measurement, the data compression processor 22 may preferably compress the obtained mass spectrum data and store the compressed imaging mass spectrometric data in compressed imaging data storage area (not shown) in the external storage device 4. Similarly, the index creation processor 24 may create the index and store the created index data in the external storage device 4 during the measurement. That is to say, the compression of the imaging mass spectrometric data and the creation of the index do not need to be performed as a batch process but may be carried out in almost real time during the measurement.

In the case where the data compression process has been performed during the measurement (without creating the index), the processes corresponding to FIG. 2, which are initially performed in the data processor unit 2 when a data file to be analyzed is indicated by the operator after the completion of the measurement, will be as follows:

For example, when the dedicated data-processing software program is executed on the computer and a data file containing the compressed imaging mass spectrometric data to be processed is indicated by the operator through the operation unit 5 (Step S1), the index creation processor 24 sequentially reads compressed mass spectrum data corresponding to each measurement point from the external storage device 4 and stores the data in the compressed data storage area 211. It also creates an index, using the compressed data, and stores it in the index storage area 212. The normalization coefficient calculator 25 calculates the TIC or XIC normalization coefficient for each measurement point from the compressed data and the index data in a manner to be described later. The peak matrix creator 26 calculates a peak matrix for a statistical analysis in a manner to be described later (Step S2). The index, TIC normalization coefficients and peak matrix calculated in this manner for the compressed mass spectrum data are respectively stored in the index storage area 212, normalization coefficient storage area 213 and peak matrix storage area 214 of the main memory 21 (Step S3).

In the case where both the data compression and the index creation have been performed during the measurement, the processes corresponding to FIG. 2, which are initially performed in the data processor unit 2 when a data file to be analyzed is indicated by the operator after the completion of the measurement, will be as follows:

For example, when the dedicated data-processing software program is executed on the computer and a data file containing the compressed imaging mass spectrometric data and the index data to be processed is indicated by the operator through the operation unit 5 (Step S1), the data input/output controller (not shown) included in the data processor unit 2 sequentially reads the compressed mass spectrum data and the corresponding index data for each measurement point from the external storage device 4 and stores the two kinds of data in the compressed data storage area 211 and the index storage area 212, respectively. The normalization coefficient calculator 25 calculates the TIC or XIC normalization coefficient for each measurement point from the compressed data and the index data in a manner to be described later. The peak matrix creator 26 calculates a peak matrix for a statistical analysis in a manner to be described later (Step S2). The index, TIC normalization coefficients and peak matrix calculated in this manner for the compressed mass spectrum data are respectively stored in the index storage area 212, normalization coefficient storage area 213 and peak matrix storage area 214 of the main memory 21 (Step S3).

[Calculation of TIC Normalization Coefficient]

Figure 5:
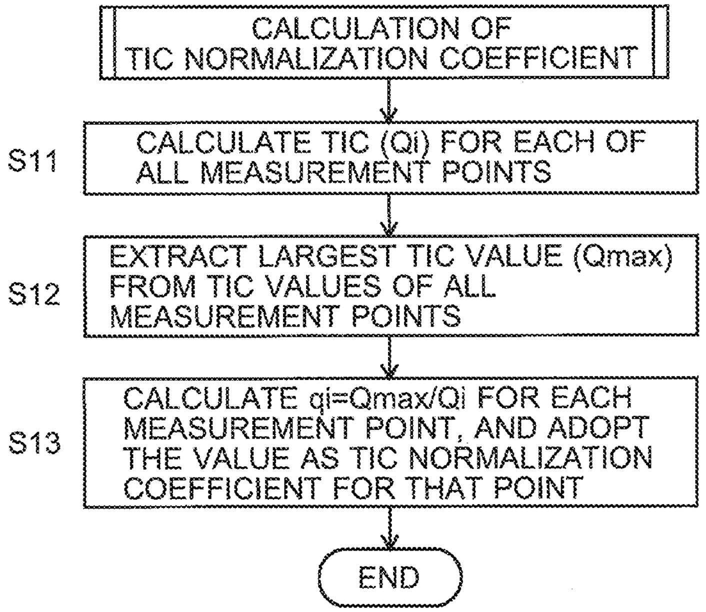
FIG. 5 is a flowchart of the process of calculating the TIC normalization coefficient in the imaging mass spectrometric system of the present embodiment.

As explained earlier, in the TIC normalization, the ion-intensity values in each mass spectrum are normalized so that the TIC, i.e. the sum of all of the ion-intensity values appearing in one mass spectrum, will be equalized among all measurement points. The TIC normalization coefficient is the normalization coefficient calculated for each measurement point for the purpose of this normalization. FIG. 5 is a detailed flowchart of the process of calculating the TIC normalization coefficient performed in Step S2.

Initially, for each of all measurement points, the TIC is calculated by totaling all of the ion-intensity values appearing in the mass spectrum over a predetermined range of mass-to-charge ratios. Here, the TIC for the ith measurement point (i=1, 2, . . . , N, where N is the total number of measurement points) is represented as Qi (Step S11). The TIC values of all measurement points (i.e. Q1 to QN) are compared to find the largest TIC value, which is denoted by Qmax (Step S12). For each measurement point, qi=Qmax/Qi is calculated, and this qi is adopted as the TIC normalization coefficient for that measurement point (Step S13). The TIC normalization coefficients obtained in this manner are stored in the normalization coefficient storage area 213 of the main memory 21.

Unlike the XIC, the TIC value can be uniquely determined since this value is the sum of all of the ion-intensity values appearing in one mass spectrum. Therefore, the TIC may be previously calculated, using the idle capacity of the CPU during the measurement. In that case, every time the mass spectrum data for one measurement point are collected by the data collector 20 during the measurement, the TIC is calculated by totaling all of the ion-intensity values appearing in the mass spectrum over a predetermined range of mass-to-charge ratios, and the obtained value is stored in the external storage device 4 together with the position information of the measurement point. Here, the TIC calculated for the ith measurement point (i=1, 2, . . . , N, where N is the total number of measurement points) is represented as Qi.

In this case, a TIC storage area (not shown) is created in the main memory 21 of the data processing unit 2 in FIG. 1. The processes corresponding to FIG. 2, which are initially performed in the data processor unit 2 when a data file to be analyzed is indicated by the operator after the completion of the measurement, will be as follows:

For example, when the dedicated data-processing software program is executed on the computer and a data file containing the compressed imaging mass spectrometric data, the index data and the TIC to be processed is indicated by the operator through the operation unit 5 (Step S1), the compressed mass spectrum data, the corresponding index data and the TIC obtained for each measurement point are sequentially read from the external storage device 4 and stored in the compressed data storage area 211, index storage area 212 and TIC storage area. The normalization coefficient calculator 25 calculates the TIC or XIC normalization coefficient for each measurement point from the TIC values, compressed data and index data stored in the main memory 21, in a manner to be described later. The peak matrix creator 26 calculates a peak matrix for a statistical analysis in a manner to be described later (Step S2). The index, the TIC and XIC normalization coefficients and the peak matrix calculated in this manner for the compressed mass spectrum data are respectively stored in the index storage area 212, normalization coefficient storage area 213 and peak matrix storage area 214 of the main memory 21 (Step S3).

In the case where the aforementioned TIC value is calculated and saved in a file during the measurement, the calculation of the TIC normalization coefficient will be performed as follows:

In the normalization coefficient calculator 25, the TIC values (i.e. Q1 to QN) of all measurement points stored in the TIC storage area of the main memory 21 are compared to find the largest TIC value, which is denoted by Qmax (Step S12). For each measurement point, qi=Qmax/Qi is calculated, and this qi is adopted as the TIC normalization coefficient for that measurement point (Step S13). The obtained TIC normalization coefficients are stored in the normalization coefficient storage area 213 of the main memory 21.

[Creation of Peak Matrix for Statistical Analysis]

The peak matrix used for a statistical analysis is composed of a one-dimensional array of mass-to-charge-ratio values which are common to all measurement points and a one-dimensional array of ion-intensity values corresponding to one measurement point. The one-dimensional array of the mass-to-charge-ratio values is created by selecting peaks from the average mass spectrum of all measurement points or the maximum intensity mass spectrum of all measurement points (which is a reconstructed mass spectrum created by extracting, for each mass-to-charge ratio, the peak having the highest intensity from the mass spectra obtained at all measurement points), and listing the mass-to-charge ratio values of those peaks. After this array of the mass-to-charge-ratio values common to all measurement points is obtained, the ion-intensity value corresponding to each mass-to-charge-ratio value listed in the array of the mass-to-charge-ratio values is located in the mass spectrum of each measurement point and arranged in the form of a list. The lists of ion-intensity values obtained in this manner for the respective measurement points are compiled into a matrix form. Thus, the peak matrix is obtained.

The mass-to-charge-ratio value of a spectrum peak corresponding to the same substance may be slightly shifted due to the mass error in the imaging mass spectrometer unit 1 or other factors. To create a peak matrix taking into account such a mass error, a mass-to-charge-ratio range with an appropriate margin may be set for each mass-to-charge-ratio value in the array of the mass-to-charge-ratio values, and the highest ion intensity within that mass-to-charge-ratio range in the mass spectrum of each measurement point may be extracted and listed as the ion-intensity value corresponding to the central mass-to-charge-ratio value of that range.

Thus, the compressed data corresponding to the mass spectrum data obtained at each measurement point, the index associated with those data, the TIC normalization coefficient calculated for each measurement point, and the peak matrix for a statistical analysis are automatically stored in the main memory 21, without requiring the operator to give a specific command, such as the command to display an imaging graphic. Meanwhile, an average mass spectrum created by averaging the mass spectrum data obtained at all of the measurement points is displayed on the screen of the display unit 6. In this state, the system stands by for the next command from the operator.

[Creation and Display of Nonnormalized Imaging Graphic]

In the case where the operator's attention is focused on a specific kind of substance among various substances contained in the sample, the mass-to-charge ratio or mass-to-charge-ratio range of the observation target is previously known to the operator. Even if there is no such previous information on the mass-to-charge ratio, the operator can specify the mass-to-charge ratio or mass-to-charge-ratio range of interest by visually examining the average mass spectrum displayed on the screen of the display unit 6 in the previously described way. When the operator wants to view an imaging graphic showing nonnormalized ion-intensity values for a mass-to-charge ratio or mass-to-charge-ratio range which is the focus of attention or interest, the operator specifies the mass-to-charge ratio or mass-to-charge-ratio range through the operation unit 5 and commands the system to display the nonnormalized imaging graphic.

In response to this command, the data decompression processor 23 refers to the index corresponding to each measurement point stored in the index storage area 212 of the main memory 21, and reads the minimally required set of compressed data corresponding to the specified mass-to-charge ratio or mass-to-charge-ratio range among the compressed data of each measurement point stored in the compressed data storage area 211 of the main memory 21. Then, a decoding process for decompressing the compressed data is performed, whereby the ion-intensity value or values of each measurement point at the specified mass-to-charge ratio or within mass-to-charge-ratio range are restored. If the lossless run-length coding is used for the data compression, the intensity values which are completely identical to those of the original mass spectrum data can be restored by decoding the compressed data.

The imaging graphic creation processor 27 determines the display colors corresponding to the intensity values, and creates the imaging graphic for the specified mass-to-charge ratio by generating a two-dimensional array of pixels with the colors corresponding to the intensity values obtained at the respective measurement points. This imaging graphic is presented on the screen of the display unit 6. Thus, the imaging graphic showing the two-dimensional distribution of a substance having a specific mass-to-charge ratio is created and displayed, as shown in the upper part of FIG. 10 (in this example, the mass-to-charge ratio is $M_1$). In the case where the display of an imaging graphic for not a single mass-to-charge ratio but a mass-to-charge-ratio range has been commanded, the imaging graphic creation processor 27 calculates an accumulated intensity value by totaling the ion-intensity values which respectively correspond to the mass-to-charge ratios included in that mass-to-charge-ratio range, determines the display colors corresponding to the accumulated intensity values, and creates the imaging graphic by generating a two-dimensional array of pixels with the colors corresponding to those values. The imaging graphic data composed of such a two-dimensional array of ion-intensity values or accumulated intensity values obtained for each measurement point are related to the mass-to-charge ratio or mass-to-charge-ratio range and stored in the imaging graphic storage area 215 of the main memory 21.

[Creation and Display of Nonnormalized Mass Spectrum]

As described earlier, the average mass spectrum for all measurement points is automatically created and displayed on the display unit 6. In many cases, the region of interest, i.e. the area which the operator is interested in within the measurement area on the sample displayed as the imaging graphic, is considerably limited. Accordingly, the present system has the function of creating an average mass spectrum of only the measurement points within a region of interest (ROI) and displaying it on the display unit 6 when the operator specifies, through the operation unit 5, the region of interest with an appropriate size and shape on the imaging graphic displayed on the display unit 6, or on a microscopic image painted based on microscopic image data.

Specifically, when the region of interest is specified through the operation unit 5 by the operator, the data decompression processor 23 refers to the index of each measurement point stored in the index storage area 212 of the main memory 21, and only reads the compressed data of the measurement points included in the region of interest among the compressed data of the measurement points stored in the compressed data storage area 211 of the main memory 21. Then, the compressed data are decompressed, whereby the mass spectrum data of each measurement point within the specified region of interest are restored. Subsequently, the mass spectrum creation processor 28 accumulates the mass spectrum data of the given measurement points for each mass-to-charge ratio and divides each accumulated value by the number of measurement points to obtain the average mass spectrum for the region of interest. This average mass spectrum is related to the information which specifies the region of interest and stored in the spectrum storage area 216 of the main memory 21. This spectrum is also displayed on the screen of the display unit 6 through the display processor 31.

[Calculation of XIC Normalization Coefficient]

Figure 6:
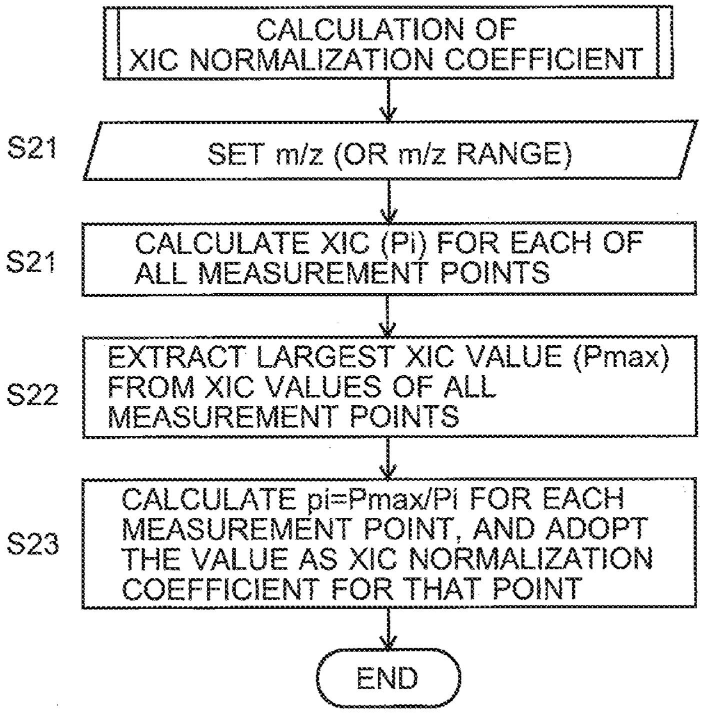
FIG. 6 is a flowchart of the process of calculating the XIC normalization coefficient in the imaging mass spectrometric system of the present embodiment.

As explained earlier, in the XIC normalization, the ion-intensity values in each mass spectrum are normalized so that the XIC, i.e. the ion-intensity value at a specific mass-to-charge ratio in one mass spectrum, will be equalized among all measurement points. FIG. 6 is a detailed flowchart of the process of calculating the XIC normalization coefficient.

When the mass-to-charge ratio or mass-to-charge-ratio range as a condition of the XIC normalization is set by the operator (Step S21), the data decompression processor 23 refers to the index of each measurement point stored in the index storage area 212 of the main memory 21, and reads the minimally required set of compressed data at the specified mass-to-charge ratio or within mass-to-charge-ratio range among the compressed data of each measurement point stored in the compressed data storage area 211 of the main memory 21. Then, the compressed data are decompressed, whereby the ion-intensity value or values obtained at the specified mass-to-charge ratio or within the specified mass-to-charge-ratio range of each measurement point are restored. Here, the XIC at the specified mass-to-charge ratio for the ith measurement point (the definition of "i" is the same as already mentioned) is hereinafter represented as Pi (Step S22). In the case where a mass-to-charge-ratio range but not a mass-to-charge ratio has been specified, the ion-intensity values at the mass-to-charge ratios within that range are accumulated, and the obtained accumulated value is used as Pi.

Next, the XIC values of all measurement points (i.e. P1 to PN) are compared to find the largest XIC value, which is denoted by Pmax (Step S23). For each measurement point, pi=Pmax/Pi is calculated, and this pi is adopted as the XIC normalization coefficient for the specified mass-to-charge ratio or mass-to-charge-ratio range (Step S24). The XIC normalization coefficient obtained in this manner for each measurement point is related to the mass-to-charge ratio or mass-to-charge-ratio range and stored in the normalization coefficient storage area 213 of the main memory 21. As already noted, unlike the TIC normalization coefficient which is independent of the mass-to-charge ratio, the XIC normalization coefficient changes with the mass-to-charge ratio or mass-to-charge-ratio range. Therefore, every time a different mass-to-charge ratio or mass-to-charge-ratio range is specified by the operator, the processing shown in FIG. 6 is performed to calculate new XIC normalization coefficients, and those coefficients are related to the mass-to-charge ratio or mass-to-charge-ratio range and stored in the normalization coefficient storage area 213 of the main memory 21.

[Creation and Display of Normalized Imaging Graphic]

In the case where the creation and display of an imaging graphic obtained through the TIC or XIC normalization is commanded by the operator, there are two possible methods for the creation. It should be noted that, if the XIC normalization is to be performed but the normalization coefficient necessary for this normalization is not yet stored in the normalization coefficient storage area 213, the previously described process of determining the XIC normalization coefficient should be performed beforehand.

(1) If Nonnormalized Imaging Graphic is Already Present

If the nonnormalized imaging graphic data for the specified mass-to-charge ratio or mass-to-charge-ratio range are already stored in the imaging graphic storage area 215, the normalizing calculation processor 29 reads that imaging graphic data (i.e. the ion-intensity value at each measurement point) from the imaging graphic storage area 215. It also reads the XIC normalization coefficients corresponding to the specified mass-to-charge ratio or mass-to-charge-ratio range from the normalization coefficient storage area 213, and corrects each ion-intensity value by multiplying the intensity value by the XIC normalization coefficient of the corresponding measurement point. The imaging graphic creation processor 27 creates an imaging graphic based on the intensity values corrected with the XIC normalization coefficients and displays it on the screen of the display unit 6 through the display processor 31. In this case, the normalized imaging graphic can be very quickly displayed, since the process merely requires multiplying the intensity value of each measurement point by the corresponding normalization coefficient.

(2) If Nonnormalized Imaging Graphic is not Yet Present

Figure 7:
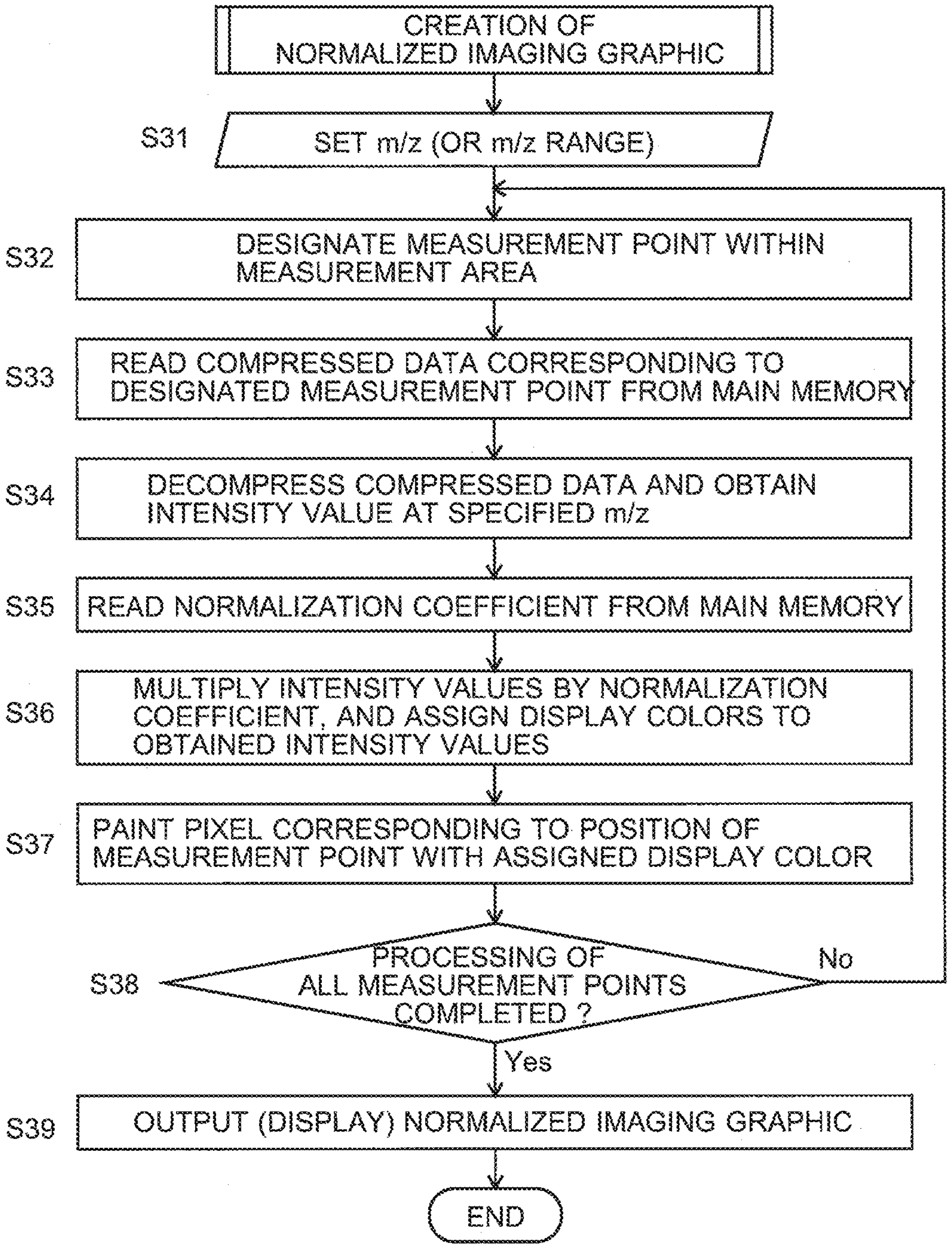
FIG. 7 is a flowchart of the process of creating and displaying a normalized imaging graphic in the imaging mass spectrometric system of the present embodiment.

If the nonnormalized imaging graphic data for the specified mass-to-charge ratio or mass-to-charge-ratio range is not yet present in the imaging graphic storage area 215, it is necessary to create an imaging graphic from the compressed data before the normalization process. FIG. 7 shows the processing flowchart for this case.

When a mass-to-charge ratio or mass-to-charge-ratio range is specified by the operator through the operation unit 5 (Step S31), the data decompression processor 23 designates one of the measurement points within the measurement area (Step S32), refers to the index corresponding to that measurement point stored in the index storage area 212 of the main memory 21, and reads the minimally required set of compressed data corresponding to the specified mass-to-charge ratio or mass-to-charge-ratio range among the compressed data of that measurement point stored in the compressed data storage area 211 of the main memory 21 (Step S33). Then, a decoding process for decompressing the compressed data is performed, whereby the ion-intensity value or values of that measurement point at the specified mass-to-charge ratio or within mass-to-charge-ratio range are restored (Step S34).

Next, the normalizing calculation processor 29 reads the TIC or XIC normalization coefficient corresponding to that measurement point stored in the normalization coefficient storage area 213 of the main memory 21 (Step S35) and corrects the intensity values restored in Step S34 by multiplying each intensity value by the read normalization coefficient. The imaging graphic creation processor 27 assigns display colors to the corrected intensity values and determines the display color of the pixel corresponding to that measurement point (Steps S36 and S37). If there is one or more unprocessed measurement points remaining within the measurement area, the operation returns from Step S38 to S32, and the processes of Steps S33 through S37 are performed on another unprocessed measurement point. After the display colors of the pixels corresponding to all measurement points are determined by repeating those processes, the normalized imaging graphic is displayed on the screen of the display unit 6 through the display processor 31 (Step S39).

In the case of simultaneously displaying a plurality of imaging graphics with different normalization conditions in order to compare them, the process of creating a two-dimensional arrangement of the intensity values normalized under one normalizing condition and temporarily holding it in the imaging graphic storage area 215 of the main memory 21 is repeated. After the imaging graphics corresponding to all normalization conditions to be displayed are completely obtained, those graphics are simultaneously displayed on the screen of the display unit 6.

[Creation and Display of Normalized Average Mass Spectrum or the Like]

Figure 8:
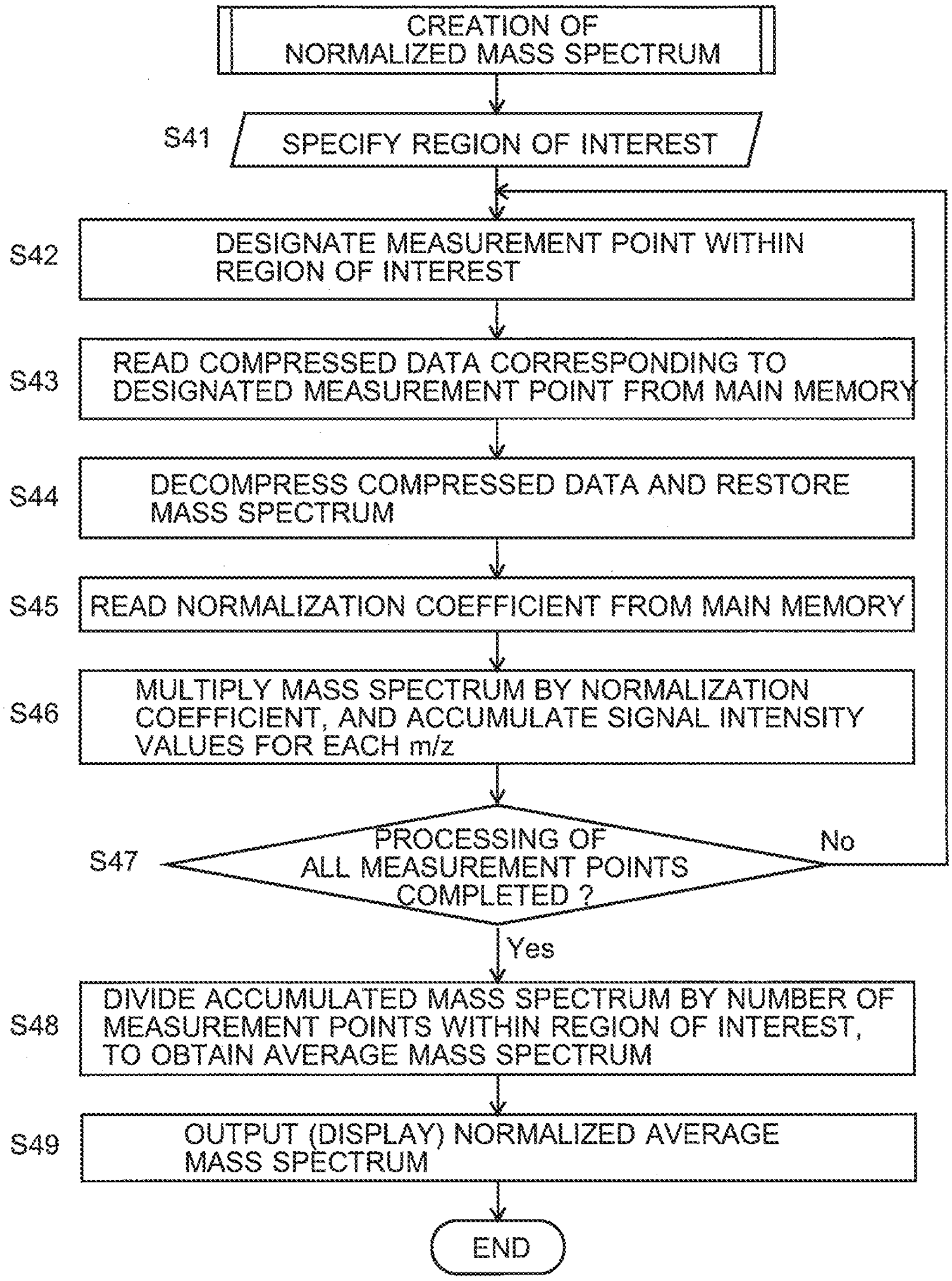
FIG. 8 is a flowchart of the process of creating and displaying a normalized mass spectrum in the imaging mass spectrometric system of the present embodiment.

FIG. 8 shows the flowchart of the process of creating and displaying a normalized average mass spectrum (or maximum intensity mass spectrum) for the measurement points within the entire measurement area or the region of interest.

For example, when a region of interest is specified by the operator through the operation unit 5 (Step S41), the data decompression processor 23 designates one of the measurement points within the region of interest (Step S42), refers to the index corresponding to that measurement point stored in the index storage area 212 of the main memory 21, and reads the compressed data of that measurement point stored in the compressed data storage area 211 of the main memory 21 (Step S43). Then, a decoding process for decompressing the compressed data is performed, whereby the ion-intensity value or values of that measurement point are restored (Step S44).

Next, the normalizing calculation processor 29 reads the TIC or XIC normalization coefficient corresponding to that measurement point stored in the normalization coefficient storage area 213 of the main memory 21 (Step S45) and corrects the intensity values restored in Step S44 over the entire mass-to-charge-ratio range, by multiplying each intensity value by the read normalization coefficient. The mass spectrum creation processor 28 accumulates the corrected intensity values for each mass-to-charge ratio (Step S46). If there is one or more unprocessed measurement points remaining within the measurement area, the operation returns from Step S47 to S42, and the processes of Steps S43 through S46 are performed on another unprocessed measurement point. After the accumulated value of the normalized ion intensity at each mass-to-charge ratio is determined at all of the measurement points within the region of interest, the mass spectrum creation processor 28 calculates the average values by dividing each accumulated value by the number of measurement points within the region of interest (Step S48), and displays the normalized average mass spectrum on the screen of the display unit 6 through the display processor 31 (Step S49).

In the case of simultaneously displaying a plurality of average mass spectra with different normalization conditions in order to compare them, the process of calculating an average mass spectrum under one normalization condition and temporarily holding it in the spectrum storage area 216 of the main memory 21 is repeated. After the average mass spectra corresponding to all normalization conditions to be displayed are completely obtained, those spectra are simultaneously displayed on the screen of the display unit 6.

Thus far, the procedure of creating a normalized imaging graphic, normalized average mass spectrum or the like has been described. In the process of handling signal intensity values by a software program, the following point must be taken into account: In any software program, signal intensity values need to be handled with a specific number of bits determined by the used data type, such as “long” or “short.” Multiplying an intensity value of each measurement point by a coefficient (such as pi or qi) in the normalization process may make the resultant intensity value greater than the largest number of bits that can be held by the “long” or “short” data type. This problem can be avoided by performing the rescaling in addition to the normalization in such a manner that the intensity values of all measurement points are multiplied by a coefficient less than one so that all intensity values will be less than the maximum value for “long” or “short” and thereby prevent the saturation of the signal value. For example, in the case of the XIC normalization, if the highest intensity value in the mass spectrum of the ith measurement point is Ii, the saturation can be assuredly avoided by performing the rescaling in such a manner that the largest value of Ii×pi among all of the measurements becomes equal to Max_long (or Max_short). Specifically, this can be achieved by the following processing:

Initially, all measurement points are searched for the largest value of Ii×pi. Suppose that the largest value has been found at the ath measurement point. In this case, the resealing should be performed so that Ia×pa will be equal to Max_long (or Max_short). That is to say, the resealing can be achieved by multiplying the intensity values at each measurement point by Max_long/(Ia×pa) or Max_short/(Ia×pa). In addition to this resealing, the intensity values at each measurement point are normalized by being multiplied by pi. In short, in the case of performing both resealing and normalization, the required operation is to multiply the intensity values at each measurement point by (Max_long×Pa)/(Ia×Pi) or (Max_short×Pa)/(Ia×Pi).

In the case of the TIC normalization, the saturation can be avoided by performing the previously described resealing with pi, Pi and Pmax simply replaced by qi, Qi and Qmax, respectively.

[Execution of Statistical Analysis]

As described earlier, a nonnormalized peak matrix is stored in the peak matrix storage area 214 of the main memory 21 in the initial stage of the entire process. Therefore, to perform a statistical analysis without normalization, the statistical analysis calculator 30 only needs to read the nonnormalized peak matrix from the peak matrix storage area 214 and perform a multivariate analysis (e.g. the primary component analysis, which is commonly known), network analysis or the like. When the statistical analysis needs to be performed with the TIC or XIC normalization, the normalizing calculation processor 29 reads the nonnormalized peak matrix from the peak matrix storage area 214 as well as the previously calculated TIC or XIC normalization coefficients from the normalization coefficient storage area 213. Then, a normalized peak matrix is calculated by multiplying each array of the intensity values in the peak matrix by the corresponding normalization coefficient, and the obtained matrix is subjected to the statistical analysis.

Figure 9:
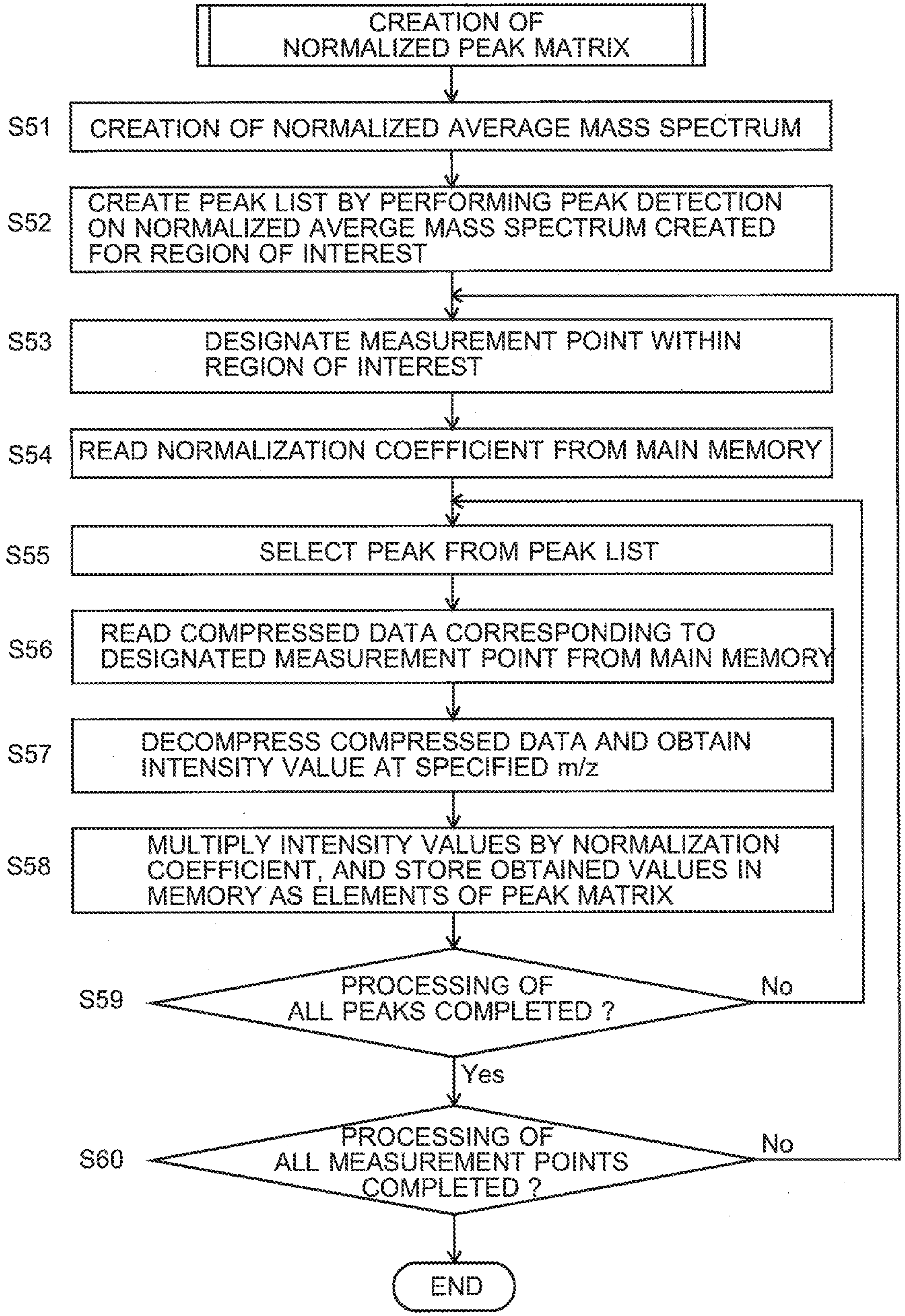
FIG. 9 is a flowchart of the process of creating a normalized peak matrix in the imaging mass spectrometric system of the present embodiment.

If the nonnormalized peak matrix is not stored, the normalized statistical processing can be performed according to the flowchart shown in FIG. 9.

Initially, for example, the previously described processing shown in FIG. 8 is performed to calculate a normalized average mass spectrum or maximum intensity mass spectrum for the entire measurement area or the specified region of interest, using the compressed data stored in the compressed data storage area 211 of the main memory 21 and the TIC or XIC normalization coefficients stored in the normalization coefficient storage area 213 (Step S51). Next, the peak matrix creator 26 performs a peak detection on the average mass spectrum or maximum intensity mass spectrum, and creates a peak list by extracting the mass-to-charge-ratio values of the detected peaks (Step S52). The normalizing calculation processor 29 designates a measurement point within the region of interest (Step S53) and reads the TIC or XIC normalization coefficient corresponding to the measurement point in question stored in the normalization coefficient storage area 213 of the main memory 21 (Step S54).

Next, the data decompression processor 23 selects one of the peaks in the peak list created in Step S52 (Step S55), refers to the index corresponding to the aforementioned measurement point stored in the index storage area 212 of the main memory 21, and reads the minimally required set of compressed data corresponding to the mass-to-charge ratio or mass-to-charge-ratio range of the selected peak among the compressed data of that measurement point stored in the compressed data storage area 211 of the main memory 21 (Step S56). Then, a decoding process for decompressing the compressed data is performed, whereby the ion-intensity value or values obtained at that measurement point at the specified mass-to-charge ratio or within mass-to-charge-ratio range are restored (Step S57).

Next, the normalizing calculation processor 29 corrects the intensity values by multiplying the intensity values restored in Step S57 by the TIC or XIC normalization coefficient read in Step S54, and stores the corrected values as the elements of the normalized peak matrix in the peak matrix storage area 214 of the main memory 21. After the processing of all peaks corresponding to one measurement point is completed by repeating the processes of Steps S55 through S58 ("Yes" in Step S59), the operation returns from Step S60 to S53, where another measurement point within the region of interest is designated and the processing of Steps S54 through S59 is once more performed. By such a processing, the normalized peak matrix can be ultimately obtained, and this matrix can be subjected to the statistical analysis.

In the case of simultaneously displaying the results of a statistical analysis performed under different normalization conditions in order to compare them, the process of performing the statistical analysis on a peak matrix obtained through the normalization process under one normalization condition and temporarily holding the result in a storage area (not shown) of the main memory 21 is repeated. After the results of the statistical analysis corresponding to all normalization conditions to be displayed are completely obtained, those results are simultaneously displayed on the screen of the display unit 6.

[Estimation of Necessary Data Sizes]

As already explained, in the system of the present embodiment, since the compressed data is held in the main memory 21, it is possible to perform various kinds of processing by a single software program, such as creating and displaying an average mass spectrum or imaging graphic or performing a statistical analysis. To perform those kinds of processing, it is necessary to hold not only the compressed mass spectrum data of all measurement points but also other related items of information in the main memory 21, such as the normalization coefficients determined under various conditions, the average mass spectrum over the entire measurement area or the region of interest, the imaging graphic at one or more mass-to-charge ratios (or within a mass-to-charge-ratio range), and the peak matrix. An example of the estimation of the required data sizes is as follows: When the number of measurement points is 250×250 and the mass-to-charge-ratio range is from 600 to 2,000, the number of data points in the direction of the mass-to-charge ratio of one mass spectrum is approximately 40,000. If the ion-intensity value is held by the "short" data type, the size of the imaging mass spectrometric data after compression is approximately 600 MB. On the other hand, holding 100 average mass spectra (or maximum intensity mass spectra) requires approximately 8 MB of memory area, holding 100 imaging graphics requires approximately 12 MB, and holding a peak matrix for 100 detected peaks requires approximately 12 MB. Additionally, if the normalization coefficient is held by the 8-byte data type of "double", the amount of data for one normalization condition is approximately 0.5 MB.

The previous example demonstrates that the amount of data including mass spectra, imaging graphics, peak matrices, normalization coefficients and other information is much smaller than that of the imaging mass spectrometric data after compression. Therefore, in order to effectively reduce the memory area necessary for simultaneously displaying a plurality of imaging graphics, average mass spectra or other information normalized under different normalization conditions, it is preferable to prepare a plurality of average mass spectra, imaging graphics, peak matrices, normalization coefficients and other information normalized under different normalization conditions and hold them in the main memory, rather than prepare and hold a plurality of sets of normalized imaging mass spectrometric data (under different normalization conditions). This method is also effective for reducing the amount of computation. Similarly, in order to effectively reduce the necessary memory area and the amount of computation in the case of simultaneously displaying the results of a plurality of statistical analyses in which the peak matrix is newly created for each analysis using a different number of peaks to be detected and different information on the peaks, it is preferable to merely prepare a plurality of peak matrices and perform those statistical analyses.

It should be noted that the previous embodiment is one example of the present invention, and any change, modification or addition appropriately made within the spirit of the present invention will naturally fall within the scope of claims of the present application.

For example, in the previous embodiment, an index is created in the data compression process so that the required compressed data can be quickly located by using the index. However, the use of the index is not indispensable for the present invention. As noted earlier, the data compression method is not limited to the previously described method. The technique for the statistical analysis is not limited to the previously mentioned examples. The technique for the normalization of the ion-intensity values is not limited to the previously mentioned examples. The process steps described in the previous embodiment according to the flowcharts do not always need to be performed in the described order; it is evident that some of those steps can be appropriately transposed without causing any related problems.

REFERENCE SIGNS LIST

1 . . . Imaging Mass Spectrometer Unit
2 . . . Data Processing Unit
20 . . . Data Collector
21 . . . Main Memory
211 . . . Compressed Data Storage Area
212 . . . Index Storage Area
213 . . . Normalization Coefficient Storage Area
214 . . . Peak Matrix Storage Area
215 . . . Imaging Graphic Storage Area
216 . . . Spectrum Storage Area
22 . . . Data Compression Processor
23 . . . Data Decompression Processor
24 . . . Index Creation Processor
25 . . . Normalization Coefficient Calculator
26 . . . Peak Matrix Creator
27 . . . Imaging Graphic Creation Processor
28 . . . Mass Spectrum Creation Processor
29 . . . Normalizing Calculation Processor
30 . . . Statistical Analysis Calculator
31 . . . Display Processor
4 . . . External Storage Device
40 . . . Noncompressed Imaging Mass Spectrometric Data Storage Area
41 . . . Microscopic Image Data Storage Area
5 . . . Operation Unit
6 . . . Display Unit
100 . . . Sample
101 . . . Measurement Area

The invention claimed is:

1. An imaging mass spectrometric data processing method for processing imaging mass spectrometric data collected by performing a mass spectrometry on each of a plurality of measurement points on a sample, the imaging mass spectrometric data including a plurality of sets of mass spectrum data, where each set is composed of a one-dimensional array of ion-intensity values, related to spatial position information of the measurement point, and the method comprising:

a) a compression step, in which a compression process is performed on the imaging mass spectrometric data of each measurement point according to a predetermined algorithm, and the obtained compressed data are stored in a first storage area of a storage unit;

b) a normalization coefficient preparation step, in which a normalization coefficient for normalizing the intensity values in the imaging mass spectrometric data of each measurement point according to a predetermined criterion is calculated for each measurement point, and the calculated result is stored in a second storage area of the storage unit;

c) a normalized spectrum creation step, in which at least one of an accumulated mass spectrum, an average mass spectrum or a maximum intensity mass spectrum composed of maximum intensity values extracted at each mass-to-charge ratio, of normalized mass spectra obtained at a plurality of designated or specific measurement points, is calculated as a normalized mass spectrum, using the compressed data of the intensity values corresponding to each measurement point stored in the first storage area of the storage unit, the normalization coefficient of each measurement point stored in the second storage area of the storage unit, and the spatial position information of the measurement points; and d) a normalized graphic creation step, in which an imaging graphic showing a two-dimensional distribution of the normalized intensity values for a designated or specific mass-to-charge ratio or mass-to-charge-ratio range is created, using the compressed data of the intensity values corresponding to each measurement point stored in the first storage area of the storage unit, the normalization coefficient of each measurement point stored in the second storage area of the storage unit, and the spatial position information of the measurement points.

2. The imaging mass spectrometric data processing method according to claim 1, further comprising:

a mass-to-charge ratio specification step, in which the normalized mass spectrum created in the normalized spectrum creation step is displayed on a screen of a display unit, and a mass-to-charge ratio or mass-to-charge-ratio range of the imaging graphic to be created in the normalized graphic creation step is set in response to a specification of the mass-to-charge ratio or mass-to-charge-ratio range by an operator based on the displayed information.

3. The imaging mass spectrometric data processing method according to claim 1, further comprising:

a spectrum creation step, in which at least one of an accumulated mass spectrum, an average mass spectrum or a maximum intensity mass spectrum of nonnormalized mass spectra obtained at a plurality of designated or specific small measurement areas is calculated, using the compressed data of the intensity values corresponding to each measurement point stored in the first storage area of the storage unit and the spatial position information of the measurement points; and a graphic creation step, in which an imaging graphic showing a two-dimensional distribution of nonnormalized intensity values for a designated or specific mass-to-charge ratio or mass-to-charge-ratio range is created, using the compressed data of the intensity values corresponding to each measurement point stored in the first storage area of the storage unit and the spatial position information of the measurement points.

4. The imaging mass spectrometric data processing method according to claim 1, further comprising:

a peak matrix creation step, in which a peak detection is performed on either the normalized mass spectrum created in the normalized spectrum creation step or nonnormalized mass spectrum to create a list of mass-to-charge-ratio values of peaks, the intensity values corresponding to the mass-to-charge ratios in the list are determined from the mass spectrum data of each measurement point, and a peak matrix holding those intensity values arranged according to the mass-to-charge-ratio values is created;

a peak matrix normalization step, in which the intensity values in the peak matrix created in the peak matrix creation step are normalized by the normalization coefficient prepared in the normalization coefficient preparation step; and a statistical analysis step, in which a statistical analysis is performed on the peak matrix normalized in the peak matrix normalization step or on the peak matrix created in the peak matrix creation step.

5. The imaging mass spectrometric data processing method according to claim 4, further comprising:

a display step, in which the imaging graphic created in the normalized graphic creation step, the normalized mass spectrum created in the normalized spectrum creation step, and a statistical analysis result obtained in the statistical analysis step are simultaneously displayed on a screen of a display unit.

6. The imaging mass spectrometric data processing method according to claim 4, further comprising:

a display step, in which all or at least some of following kinds of information are simultaneously displayed on a screen of a display unit: one normalized imaging graphic or a plurality of normalized imaging graphics with different normalization conditions created in the normalized graphic creation step; one normalized mass spectrum or a plurality of normalized mass spectra with different normalization conditions created in the normalized spectrum creation step; and the statistical analysis result obtained in the statistical analysis step in which a statistical analysis is performed on one normalized peak matrix or a plurality of normalized peak matrices with different normalization conditions normalized in the peak matrix normalization step, or on the peak matrix created in the peak matrix creation step.

7. An imaging mass spectrometric data processing method for processing imaging mass spectrometric data collected by performing a mass spectrometry on each of a plurality of measurement points on a sample, the imaging mass spectrometric data including a plurality of sets of mass spectrum data, where each set is composed of a one-dimensional array of ion-intensity values, related to spatial position information of the measurement point, and the method comprising:

a) a compression step, in which a compression process is performed on the imaging mass spectrometric data of each measurement point according to a predetermined algorithm, and the obtained compressed data are stored in a first storage area of a storage unit;

b) a graphic creation step, in which an imaging graphic showing a two-dimensional distribution of nonnormalized intensity values for a designated or specific mass-to-charge ratio or mass-to-charge-ratio range is created, using the compressed data of the intensity values corresponding to each measurement point stored in the first storage area of the storage unit and the spatial position information of the measurement points;

c) a spectrum creation step, in which at least one of an accumulated mass spectrum, an average mass spectrum or a maximum intensity mass spectrum of nonnormalized mass spectra obtained at a plurality of designated or specific small measurement areas is calculated, using the compressed data of the intensity values corresponding to each measurement point stored in the first storage area of the storage unit and the spatial position information of the measurement points;

d) a peak matrix creation step, in which a peak detection is performed on the mass spectrum created in the spectrum creation step to create a list of mass-to-charge-ratio values of peaks, the intensity values corresponding to the mass-to-charge ratios in the list are determined from the mass spectrum data of each measurement point, and a peak matrix holding those intensity values arranged according to the mass-to-charge-ratio values is created; and e) a statistical analysis step, in which a statistical analysis is performed on the peak matrix created in the peak matrix creation step.

8. The imaging mass spectrometric data processing method according to claim 1, wherein:

index information for relating the compressed data to position information of the intensity values in the array of the original data is stored in a third area of the storage unit in addition to the compressed data, and the index information is referenced to retrieve the intensity values corresponding to a specific mass-to-charge ratio.

9. An imaging mass spectrometer comprising: an imaging mass spectrometer unit for collecting mass spectrum data by performing a mass spectrometry on each of a plurality of measurement points on a sample; and a data processing unit for carrying out the imaging mass spectrometric data processing method according to claim 1.

10. The imaging mass spectrometric data processing method according to claim 3, further comprising:

a peak matrix creation step, in which a peak detection is performed on either the normalized mass spectrum created in the normalized spectrum creation step or nonnormalized mass spectrum to create a list of mass-to-charge-ratio values of peaks, the intensity values corresponding to the mass-to-charge ratios in the list are determined from the mass spectrum data of each measurement point, and a peak matrix holding those intensity values arranged according to the mass-to-charge-ratio values is created;

a peak matrix normalization step, in which the intensity values in the peak matrix created in the peak matrix creation step are normalized by the normalization coefficient prepared in the normalization coefficient preparation step; and a statistical analysis step, in which a statistical analysis is performed on the peak matrix normalized in the peak matrix normalization step or on the peak matrix created in the peak matrix creation step.

11. The imaging mass spectrometric data processing method according to claim 10, further comprising:

a display step, in which all or at least some of following kinds of information are simultaneously displayed on a screen of a display unit: one normalized imaging graphic or a plurality of normalized imaging graphics with different normalization conditions created in the normalized graphic creation step, or an imaging graphic created in the graphic creation step; one normalized mass spectrum or a plurality of normalized mass spectra with different normalization conditions created in the normalized spectrum creation step, or a mass spectrum created in the spectrum creation step; and the statistical analysis result obtained in the statistical analysis step in which a statistical analysis is performed on one normalized peak matrix or a plurality of normalized peak matrices with different normalization conditions normalized in the peak matrix normalization step, or on the peak matrix created in the peak matrix creation step.

12. The imaging mass spectrometric data processing method according to claim 7, wherein:

index information for relating the compressed data to position information of the intensity values in the array of the original data is stored in a third area of the storage unit in addition to the compressed data, and the index information is referenced to retrieve the intensity values corresponding to a specific mass-to-charge ratio.

13. An imaging mass spectrometer comprising: an imaging mass spectrometer unit for collecting mass spectrum data by performing a mass spectrometry on each of a plurality of measurement points on a sample; and a data processing unit for carrying out the imaging mass spectrometric data processing method according to claim 7.

* * * * *